United States Patent
Nishiguchi et al.

(10) Patent No.: US 10,200,913 B2
(45) Date of Patent: Feb. 5, 2019

(54) INFORMATION DISTRIBUTION SYSTEM AND INFORMATION DISTRIBUTION APPARATUS

(71) Applicant: FUJITSU LIMITED, Kawasaki-shi, Kanagawa (JP)

(72) Inventors: Naoki Nishiguchi, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 15/416,864

(22) Filed: Jan. 26, 2017

(65) Prior Publication Data

US 2017/0238212 A1 Aug. 17, 2017

(30) Foreign Application Priority Data

Feb. 17, 2016 (JP) .................. 2016-028301

(51) Int. Cl.
*H04W 28/10* (2009.01)
*H04W 76/19* (2018.01)
*H04W 76/15* (2018.01)
*H04W 76/18* (2018.01)
*H04W 76/10* (2018.01)

(52) U.S. Cl.
CPC .......... *H04W 28/10* (2013.01); *H04W 76/10* (2018.02); *H04W 76/15* (2018.02); *H04W 76/18* (2018.02); *H04W 76/19* (2018.02)

(58) Field of Classification Search
CPC . H04W 28/10; H04W 76/025; H04W 76/028; H04W 76/15
See application file for complete search history.

(56) References Cited

U.S. PATENT DOCUMENTS

| | | |
|---|---|---|
| 2004/0078426 A1 | 4/2004 | Nagami et al. |
| 2005/0025090 A1 | 2/2005 | Klein et al. |
| 2012/0303493 A1* | 11/2012 | Ishii .................. G06Q 10/08 705/28 |

FOREIGN PATENT DOCUMENTS

| | | |
|---|---|---|
| JP | 2003-60655 | 2/2003 |
| JP | 2004-139291 | 5/2004 |
| JP | 2005-57757 | 3/2005 |
| JP | 2012-195722 | 10/2012 |
| JP | 2014-206799 | 10/2014 |

* cited by examiner

*Primary Examiner* — Mewale A Ambaye
(74) *Attorney, Agent, or Firm* — Staas & Halsey LLP

(57) ABSTRACT

An information distribution apparatus includes a memory and a processor. The memory is configured to store connection information used to allow one of a plurality of terminals or a group of terminals among the plurality of terminals to be coupled to the information distribution apparatus. The processor is the processor configured to receive an access request from a first terminal among the plurality of terminals. The access request requests to access the information distribution apparatus. The processor is the processor configured to notify the first terminal of first connection information used to allow the first terminal to be individually coupled to the information distribution apparatus. The processor is the processor configured to replace, upon determining to allow the first terminal to access the information distribution apparatus, second connection information currently stored in the memory with the first connection information to allow the first terminal to access the information distribution apparatus.

6 Claims, 20 Drawing Sheets

FIG. 12A

```
TERMINAL a INFORMATION
  CONNECTION STATE: CONNECTED
  CONNECTION INFORMATION: SSIDa
  NOTIFICATION STATE: NOT YET
  GROUP: ABSENT
```

FIG. 12B

```
TERMINAL a INFORMATION
  CONNECTION STATE: CONNECTED
  CONNECTION INFORMATION: SSIDa
  NOTIFICATION STATE: COMPLETED
  GROUP: ABSENT
```

FIG. 12C

```
TERMINAL a INFORMATION
  CONNECTION STATE: DISCONNECTED
  CONNECTION INFORMATION: SSIDa
  NOTIFICATION STATE: COMPLETED
  GROUP: ABSENT
```

FIG. 12D

TERMINAL a INFORMATION
CONNECTION STATE: DISCONNECTED
CONNECTION INFORMATION: SSIDa
NOTIFICATION STATE: COMPLETED
GROUP: ABSENT

TERMINAL b INFORMATION
CONNECTION STATE: CONNECTED
CONNECTION INFORMATION: SSIDb
NOTIFICATION STATE: NOT YET
GROUP: ABSENT

US 10,200,913 B2

INFORMATION DISTRIBUTION SYSTEM AND INFORMATION DISTRIBUTION APPARATUS

CROSS-REFERENCE TO RELATED APPLICATION

This application is based upon and claims the benefit of priority of the prior Japanese Patent Application No. 2016-028301, filed on Feb. 17, 2016, the entire contents of which are incorporated herein by reference.

FIELD

The embodiment discussed herein is related to an information distribution system and an information distribution apparatus.

BACKGROUND

Conventionally, in a wireless connection environment, a failure in communication or a disconnection may occur as the number of terminals being connected increases.

Under the circumstance, a first technology is known in which a base station adjusts a communication start time of a terminal being connected to the base station. For example, based on a desired communication start time received from the connected terminal and communication start times of respective other terminals allowed to be connected to the base station, the base station adjusts the communication start time of the connected terminal to be different from the communication start times of the other terminals.

In addition, a second technology is known in which a relay device controls a connection in response to a request made from a terminal to a server. When the number of requests exceeds a predetermined number, the relay device rejects the overflow requests and notifies the rejected terminals of a time period in which a service is available.

Related techniques are disclosed in, for example, Japanese Laid-Open Patent Publication No. 2012-195722, Japanese Laid-Open Patent Publication No. 2004-139291, and Japanese Laid-Open Patent Publication No. 2003-060655.

SUMMARY

According to an aspect of the present invention, provided is an information distribution apparatus including a memory and a processor coupled to the memory. The memory is configured to store therein connection information used to allow one of a plurality of terminals or a group of terminals among the plurality of terminals to be coupled to the information distribution apparatus. The processor is the processor configured to receive an access request from a first terminal among the plurality of terminals. The access request requests to access the information distribution apparatus. The processor is the processor configured to notify the first terminal of first connection information used to allow the first terminal to be individually coupled to the information distribution apparatus. The processor is the processor configured to replace, upon determining to allow the first terminal to access the information distribution apparatus, second connection information currently stored in the memory with the first connection information to allow the first terminal to access the information distribution apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

In related arts, there is a problem in that the relay device may not be efficiently connected to a plurality of terminals under a situation where the relay device is unable to be connected to all of terminals requesting a connection.

For example, in the first technology, although the base station adjusts the communication start time of the terminal being connected to the base station to be different from the communication start times of other terminals, the first technology does not adjust a connection of a terminal not being connected to the base station. Accordingly, even in the first technology, the base station may not be efficiently connected to a plurality of terminals under the situation where the base station is unable to be connected to all of terminals requesting a connection.

In the second technology, although the relay device rejects the overflow requests and notifies the rejected terminals of a time period in which a service is available, the second technology does not adjust a connection of a terminal not being connected to the relay device. Accordingly, even in the second technology, the relay device may not be efficiently connected to a plurality of terminals under the situation where the relay device is unable to be connected to all of terminals requesting a connection.

BRIEF DESCRIPTION OF DRAWINGS

FIG. 12A is a diagram illustrating an example of contents of the connection terminal information;

FIG. 12B is a diagram illustrating an example of contents of the connection terminal information;

FIG. 12C is a diagram illustrating an example of contents of the connection terminal information;

FIG. 12D is a diagram illustrating an example of contents of the connection terminal information;

DESCRIPTION OF EMBODIMENT

In the following, an embodiment of an information distribution system and an information distribution apparatus in the present disclosure will be described in detail with reference to the drawings. The present disclosure is not limited to the embodiment.

Embodiment

Figure 1:
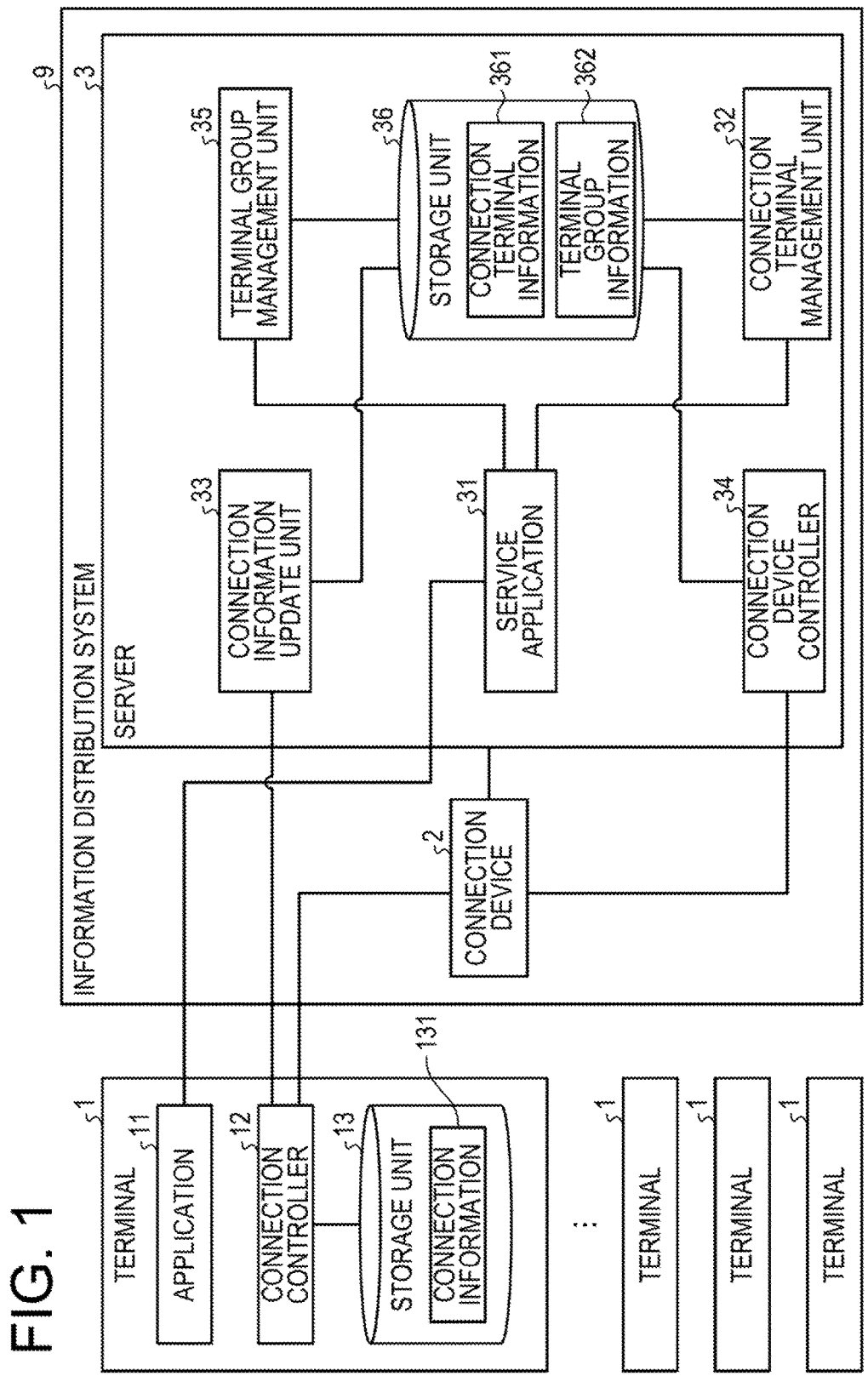
FIG. 1 is a diagram illustrating a functional configuration of an information distribution system according to an embodiment.

FIG. 1 is a diagram illustrating a functional configuration of an information distribution system according to an embodiment. As illustrated in FIG. 1, an information distribution system 9 includes a connection device 2 and a server 3. In the information distribution system 9, the server 3 is connected to a plurality of terminals 1 through the connection device 2 in accordance with a predetermined method of scheduling, and distributes information to the connected terminals 1. For example, the information distribution system 9 is used for distributing information such as teaching materials from the server 3 to the plurality of terminals 1. While the case where the information distribution system 9 is used for distributing teaching materials is merely illustrative, the use of the information distribution system 9 is not limited thereto.

Each terminal 1 has a wireless communication function and is connected to the connection device 2 through a wireless communication. The wireless communication is, for example, the wireless fidelity (WiFi) (registered trademark) or a wireless communication conforming to the Bluetooth (registered trademark) specification. Examples of the terminal 1 may include a personal computer (PC), a tablet terminal, and a smart phone.

The terminal 1 includes an application 11, a connection controller 12, and a storage unit 13.

The application 11 is a program for receiving a service provided by the server 3.

The connection controller 12 acquires, from the server 3, connection information 131 used for allowing the terminal 1 to be individually connected to the connection device 2, and stores the acquired connection information 131 in the storage unit 13. The connection controller 12 is connected to the connection device 2 using the connection information 131 set in the storage unit 13 when allowed to be connected. The expression "when allowed to be connected" means when connection information identical to the connection information 131 is set in the connection device 2. When the connection controller 12 is connected to the connection device 2 using the connection information 131, the application 11 is able to receive the service provided by the server 3. Details of the connection controller 12 will be described later.

The storage unit 13 corresponds to a storage device such as a non-volatile semiconductor memory element including a flash memory or a ferroelectric random access memory (FRAM) (registered trademark). The storage unit 13 stores therein the connection information 131.

Figure 2:
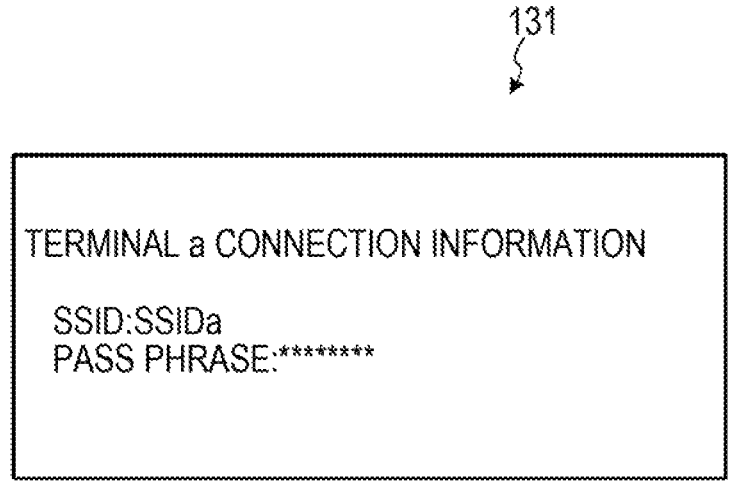
FIG. 2 is a diagram illustrating an example of connection information.

The connection information 131 is used for allowing the terminal 1 to be individually connected to the connection device 2. For example, the connection information 131 includes a service set identifier (SSID) and a pass phrase. The SSID is an identification name of the connection device 2 in a wireless communication. The pass phrase corresponds to a password or an encryption key. An example of the connection information 131 will be described with reference to FIG. 2. FIG. 2 is a diagram illustrating an example of connection information. In the connection information 131 illustrated in FIG. 2, connection information for a terminal "a" is illustrated. In the connection information 131, items of "SSID" and "pass phrase" are prescribed. In FIG. 2, "SSIDa" is set in the "SSID" item, and "********" is set in the "pass phrase" item. The connection information 131 may be information used for allowing each of the plurality of terminals 1 to be individually connected to the connection device 2. When some terminals 1 are grouped, the connection information 131 may be information used for collectively connecting the grouped terminals 1.

The connection device 2 functions as an access point (AP). The connection device 2 has a wireless communication function and connects the terminals 1 to the server 3. The connection device 2 is an example of a relay device. By performing a setting change of changing the SSID, the connection device 2 specifies a terminal 1 that is allowed to be connected. The connection device 2 is, for example, a wireless AP, a router, or a bridge. The connection device 2 according to the embodiment may be connected to a single terminal 1, and furthermore, may be connected to, for example, dozens of terminals 1 simultaneously.

The server 3 has a communication function, and is connected to the connection device 2 through a wired or wireless communication. The server 3 notifies a terminal 1 which has made an access request, among the plurality of terminals 1, of the connection information used for an individual connection to the connection device 2. The server 3 performs a setting change of changing the connection information set in the connection device 2 to the connection information for the terminal 1, for which connection is allowed, in accordance with the predetermined method of scheduling. Accordingly, the server 3 becomes able to be simultaneously connected, through the connection device 2, to a plurality of terminals 1 having connection information identical to the connection information set in the connection device 2, in accordance with the predetermined method of scheduling. A configuration in which the server 3 is separated from the connection device 2 is described in the embodiment but is not limited thereto. That is, the server 3 and the connection device 2 may be configured by a single device. The single device configured with the server 3 and the connection device 2 is an example of the information distribution apparatus.

The server 3 includes a service application 31, a connection terminal management unit 32, a connection information update unit 33, a connection device controller 34, a terminal group management unit 35, and a storage unit 36. The service application 31 is a program for providing a predetermined service. The service application 31 may include a program for distributing teaching materials as an example but is not limited thereto.

The storage unit 36 corresponds to a storage device such as, for example, a non-volatile semiconductor memory element including a flash memory or an FRAM (registered trademark). The storage unit 36 includes connection terminal information 361 and terminal group information 362. The connection terminal information 361 is information about a connection of each terminal 1 allowed to be connected. The connection terminal information 361 includes, for example, connection information 131 for each terminal 1 allowed to be connected and a notification state indicating whether the connection information 131 is notified to the terminal 1. The terminal group information 362 is information about a connection in a case of grouping a plurality of terminals 1 allowed to be connected. For example, the terminal group information 362 includes, for each group, connection information 131 used in the group and identification information of the terminals 1 constituting the group. An example of the connection terminal information 361 and an example of the terminal group information 362 will be described later.

The connection terminal management unit 32 manages the terminals 1 allowed to be connected.

For example, when a connection instruction for a specific terminal 1 is received from the service application 31, the connection terminal management unit 32 sets a connection state of the terminal as "connected" and also sets the connection information 131, in the connection terminal information 361 for the specific terminal 1. The connection terminal management unit 32 requests the connection information update unit 33, which will be described later, to notify the specific terminal 1 of the connection information 131 set in the connection terminal information 361. Further, the connection terminal management unit 32 requests the connection device controller 34, which will be described later, to perform a setting change of changing connection information set in the connection device 2 to the connection information 131 that is set in the connection terminal information 361.

When a connection instruction for a specific group is received from the service application 31, the connection terminal management unit 32 performs a similar process for the terminals 1 belonging to the specific group, to the process performed when the connection instruction for the specific terminal 1 is received.

When a disconnection instruction for the specific terminal 1 is received from the service application 31, the connection terminal management unit 32 sets the connection state of the terminal as "disconnected", in the connection terminal information 361 for the specific terminal 1. Further, the connection terminal management unit 32 requests the connection device controller 34 to perform a setting change of changing the connection information 131 currently set in the connection device 2 to different connection information.

The connection information update unit 33 notifies the terminal 1 of the connection information 131. For example, when a notification request for the connection information 131 is received from the connection terminal management unit 32 or the connection device controller 34, the connection information update unit 33 notifies the terminal 1, which is designated in the notification request, of the connection information 131. The connection information update unit 33 sets the notification state as "completed", in the connection terminal information 361 for the designated terminal 1.

The connection device controller 34 controls the connection device 2. That is, the connection device controller 34 causes the connection device 2 to set the connection information 131 for a terminal 1 to be connected, in accordance with the predetermined method of scheduling. For example, in a case where a request to perform a setting change of changing the connection information currently set in the connection device 2 to new connection information 131 is received from the connection terminal management unit 32, the connection device controller 34 instructs the connection device 2 to perform the setting change of changing the connection information currently set in the connection device 2 the new connection information 131 when the new connection information 131 is already notified to the terminal 1 to be connected. Accordingly, the terminal 1 having connection information identical to the connection information 131 set in the connection device 2 may be connected to the connection device 2 so as to receive a service provided by the service application 31 through the connection device 2.

A case where scheduling by the connection device controller 34 is needed will be described. As a first example, there may be a case where the connection information 131 is not narrowed down to a single piece of connection information 131 with respect to terminals 1 to be connected. In such a case, for example, the connection device controller 34 schedules setting to the connection device 2 using respective pieces of connection information 131. As an example, the connection device controller 34 may switch the respective pieces of connection information 131 to be set in the connection device 2. As a second example, there may be a case where the connection information 131 is determined to a single piece of information with respect to terminals 1 to be connected, but the relevant connection information 131 is not notified to some terminals 1. In such a case, for example, the connection device controller 34 lists the terminals 1 to which the relevant connection information 131 is not yet notified. For each of the listed terminals 1, the connection device controller 34 sets connection information 131, which is already notified to the listed terminal and different from the relevant connection information 131, in the connection device 2 so that the listed terminal 1 is able to be connected. The connection device controller 34 causes the connection information update unit 33 to notify of the relevant connection information 131 which is not yet notified to the listed terminal 1. After the relevant connection information 131 is notified to all the listed terminals 1, the connection device controller 34 sets the relevant connection information 131 in the connection device 2 to connect all the listed terminals 1. As a third example, there may be a case where the number of terminals 1 to be connected by using the same connection information 131 exceeds the allowable number of connections. In such a case, for example, the connection device controller 34 schedules the setting of the connection information 131 to the connection device 2 such that the number of terminals 1 to be connected does not exceed the allowable number of connections. As an example, the connection device controller 34 may employ subgroups, which will be described later, and use unique connection information 131 for each subgroup.

The terminal group management unit 35 manages a group of terminals 1.

For example, when a grouping instruction is received from the service application 31, the terminal group management unit 35 generates terminal group information 362 and stores the terminal group information 362 in the storage unit 36. The grouping instruction mentioned here refers to an instruction to group terminals 1 specified by the service application 31 as to be connected collectively. The terminal group management unit 35 adds connection information 131 for the group and sets the notification state as "not yet" in the connection terminal information 361 for the terminals 1 that belong to the group. The terminal group management unit 35 requests the connection information update unit 33 to notify the terminals 1 belonging to the group of the connection information 131 for the group which is set in the connection terminal information 361.

When an ungrouping instruction is received from the service application 31, the terminal group management unit 35 deletes the terminal group information 362 for the corresponding group from the storage unit 36. The terminal group management unit 35 may notify the terminals 1 belonging to the group to delete connection information 131 for the group.

Subsequently, an example of the connection terminal information 361 will be described with reference to FIGS. 3A and 3B.

Figure 3A:
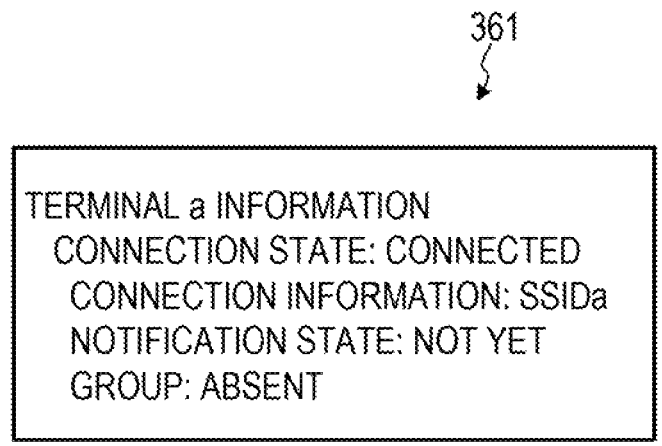
FIG. 3A is a diagram illustrating an example of connection terminal information in a case of not being grouped.

FIG. 3A is a diagram illustrating an example of the connection terminal information in a case of not being grouped. In the connection terminal information 361 illustrated in FIG. 3A, connection terminal information for a terminal "a" is illustrated. In the connection terminal information 361, items of "connection state", "connection information", "notification state", and "group" are prescribed. The "connection state" item indicates whether the server 3 is connected to the terminal "a". In the "connection state" item, "connected" is set when the server 3 is connected to the terminal "a", and "disconnected" is set when the server 3 is not connected to the terminal "a". The "connection information" item indicates information used for allowing the terminal "a" to be individually connected to the connection device 2 and includes an SSID and a pass phrase. In FIG. 3A, "SSIDa" is set and the pass phrase is not set in the "connection information" item. The "notification state" item indicates whether the server 3 has notified the terminal "a" of the connection information. In the "notification state" item, "completed" is set when the server 3 has notified the terminal "a" of the connection information, and "not yet" is set when the server 3 has not notified the terminal "a" of the connection information. The "group" item indicates whether the terminal "a" is included in a group. In the "group" item, "present" is set when the terminal "a" is included in a group and "absent" is set when the terminal "a" is not included in a group. In FIG. 3A, "absent" indicating that the terminal "a" is not included in a group is set in the "group" item.

Figure 3B:
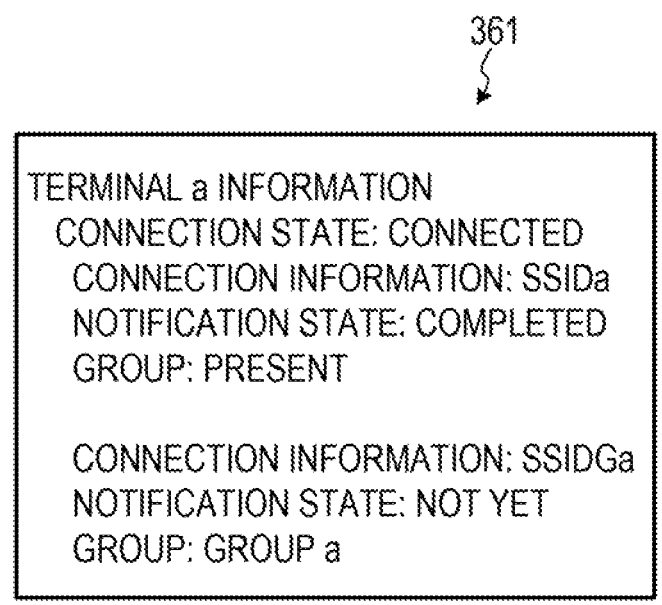
FIG. 3B is a diagram illustrating an example of connection terminal information in a case of being grouped.

FIG. 3B is a diagram illustrating an example of the connection terminal information in a case of being grouped. In the connection terminal information 361 illustrated in FIG. 3B, connection terminal information for a terminal "a" is illustrated. In the connection terminal information 361, items of "connection state", "connection information", "notification state", and "group" are prescribed as described with reference to FIG. 3A. Additionally, in the connection terminal information 361, items of "connection information", "notification state", and "group" are prescribed as information in a case of being grouped. The "connection information" item as information in a case of being grouped indicates information used for allowing the terminal "a" to be connected to the connection device 2 as a group member and includes an SSID and a pass phrase. That is, the "connection information" item indicates connection information for the group. In FIG. 3B, "SSIDGa" is set and the pass phrase is not set in the "connection information" item. The "notification state" item indicates whether the server 3 has notified the terminal "a" of the connection information for the group. In the "notification state" item, "completed" is set when the server 3 has notified the terminal "a" of the connection information for the group, and "not yet" is set when the server 3 has not notified the terminal "a" of the connection information for the group. The "group" item indicates an identifier of a group to which the terminal "a" belongs. In FIG. 3B, "group a" is set in the "group" item.

Figure 4:
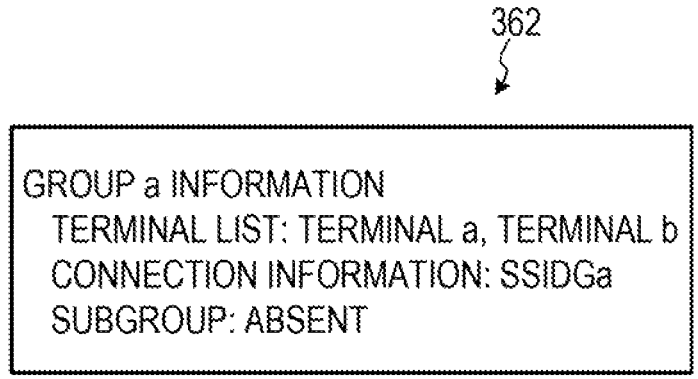
FIG. 4 is a diagram illustrating an example of terminal group information.

Subsequently, an example of the terminal group information 362 will be described with reference to FIG. 4. FIG. 4 is a diagram illustrating an example of the terminal group information. In the terminal group information 362 illustrated in FIG. 4, terminal group information for a group "a" is illustrated. In the terminal group information 362, items of "terminal list", "connection information", and "subgroup" are prescribed. The "terminal list" item indicates a list of terminals 1 which belong to the group. In FIG. 4, "terminal a" and "terminal b" are set in the "terminal list" item. The "connection information" item indicates connection information for the group and includes an SSID and a pass phrase. In FIG. 4, "SSIDGa" is set and the pass phrase is not set in the "connection information" item. The "subgroup" item indicates whether the terminals belonging to the group are divided into subgroups within the group. The subgroup is used when it is determined by the service application 31 that the terminals 1 to be connected are preferably divided. In the "subgroup" item, "present" is set in a case where the terminals are divided into subgroups within the group, and "absent" is set in a case where the terminals are not divided into subgroups within the group. In FIG. 4, "absent" indicating that the terminals are not divided into subgroups is set in the "subgroup" item.

When "present" indicating that the terminals are divided into subgroups is set in the "subgroup" item, items of "terminal list" and "connection information" for each subgroup may be preferably added to the terminal group information 362. Also, items of "connection information", "notification state", and "subgroup" for a subgroup may be added to the connection terminal information 361 in a case of being grouped.

Description will be made on a case where terminals are divided into subgroups within a group. As a first example, the communications traffic being distributed may exceed a predetermined amount and thus, the service application 31 may determine that the terminals 1 within a group are preferably divided to be connected. This is because communications of simultaneously connected terminals 1 produce a considerable load. As a second example, the number of the terminals 1 within a group may exceed an allowable number of connections and thus the service application 31 may determine that the terminals 1 within a group are preferably divided to be connected. This is because when the number of simultaneously connected terminals 1 exceeds the allowable number of connections, communications with the terminals 1 become unable. As a third example, there may be a case where the terminals 1 have different electric wave intensities and thus the service application 31 may determine that the terminals 1 having different electric wave intensities may be divided to be connected. This is because when the service application 31 simultaneously distributes data to a plurality of terminals 1 having different electric wave intensities, the data distributed by the service application 31 may arrive at the terminals 1 having relatively stronger electric wave intensities and may not arrive at the terminals 1 having relatively weaker electric wave intensities and located far away.

Figure 5:
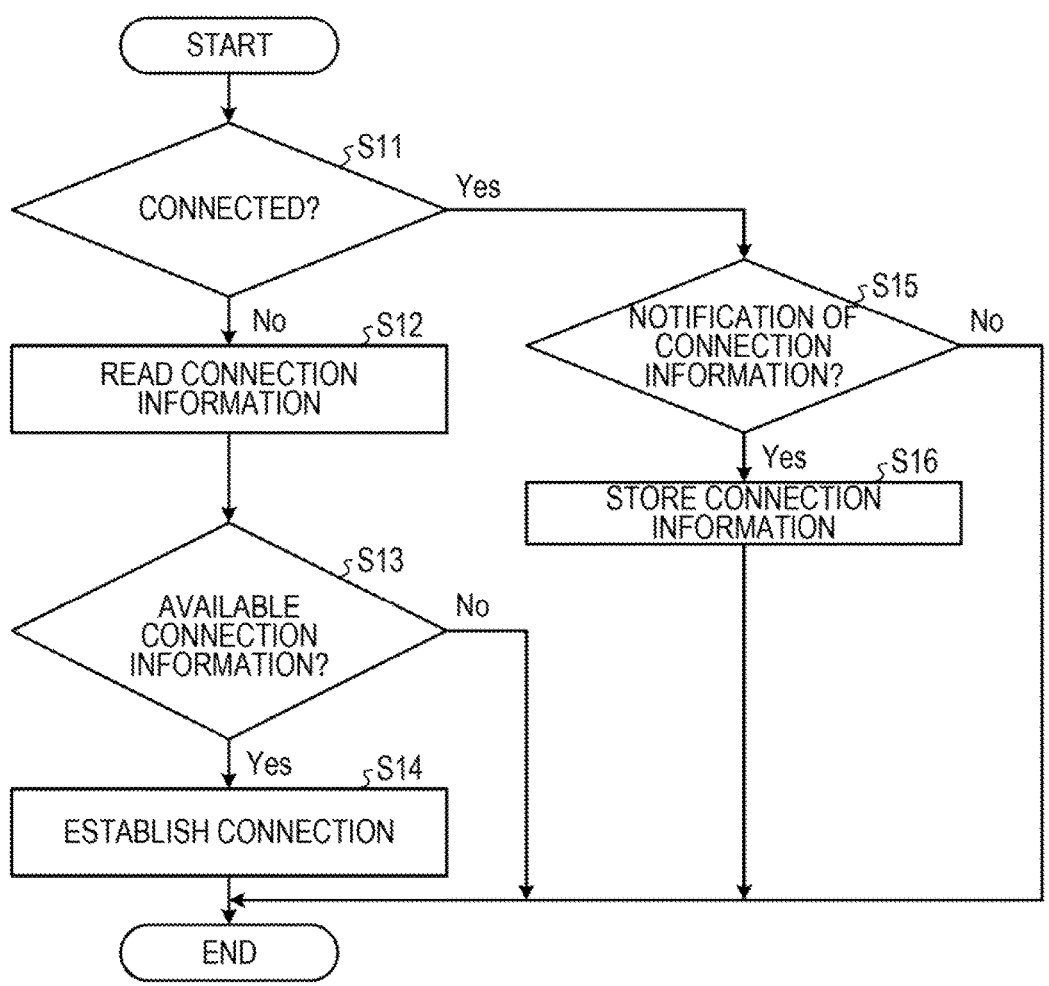
FIG. 5 is a flowchart illustrating an example of processing of a connection controller according to the embodiment.

Subsequently, descriptions will be made on processing of the connection controller 12 included in the terminal 1 with reference to FIG. 5. FIG. 5 is a flowchart illustrating an example of processing of a connection controller according to the embodiment.

As illustrated in FIG. 5, the connection controller 12 determines whether the terminal 1 is connected to the connection device 2 (S11). When it is determined that the terminal 1 is not connected to the connection device 2 ("NO" at S11), the connection controller 12 reads the connection information 131 from the storage unit 13 (S12).

The connection controller 12 determines whether connection information 131 available to establish a connection to the connection device 2 is present (S13). When it is determined that connection information 131 available to establish a connection to the connection device 2 is present ("YES" at S13), the connection controller 12 sets the connection information 131 in an operating system (OS) in the terminal 1 and establish a connection to the connection device 2 (S14). Then, the connection controller 12 ends the connection control processing.

When it is determined that connection information 131 available to establish a connection to the connection device 2 is absent ("NO" at S13), the connection controller 12 ends the connection control processing.

When it is determined that the terminal 1 is connected to the connection device 2 ("YES" at S11), the connection controller 12 determines whether a notification of the connection information 131 is made from the server 3 (S15). When it is determined that a notification of connection information 131 is made from the server 3 ("YES" at S15), the connection controller 12 stores the notified connection information 131 in the storage unit 13 (S16). Then, the connection controller 12 ends the connection control processing.

When it is determined that no notification of connection information 131 is made from the server 3 ("NO" at S15), the connection controller 12 ends the connection control processing.

Figure 6:
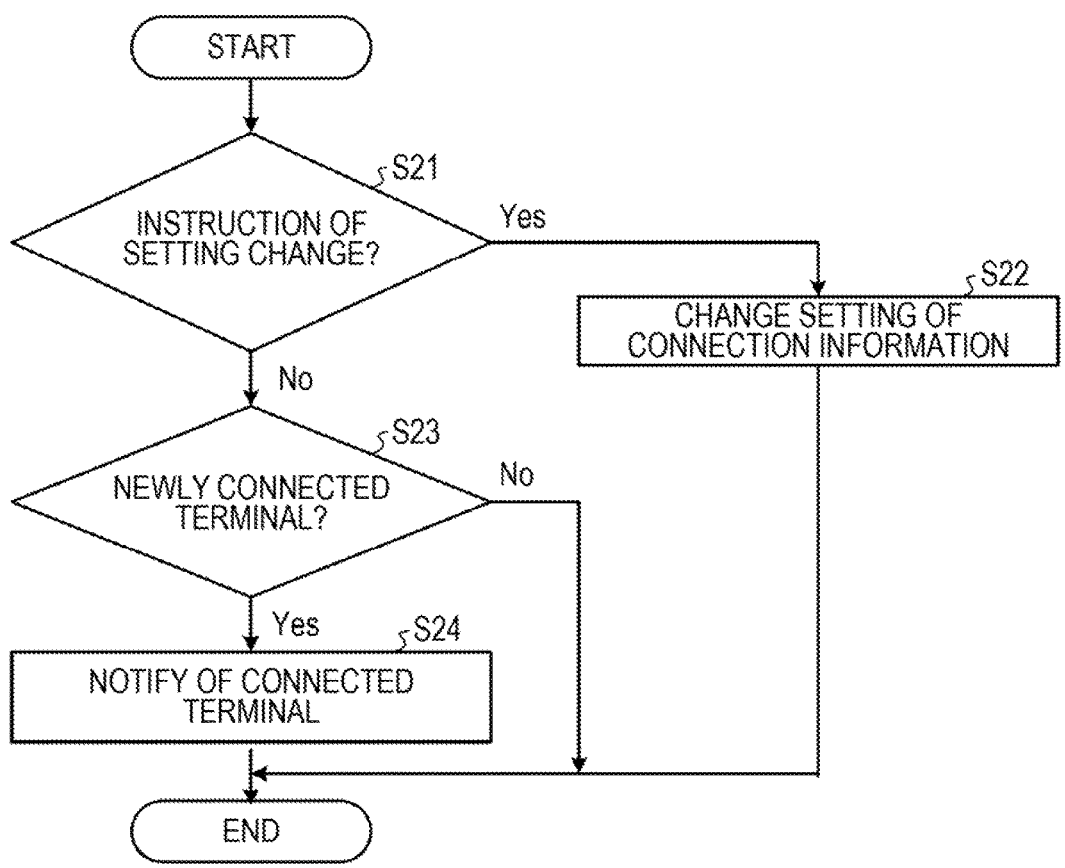
FIG. 6 is a flowchart illustrating an example of processing of a connection device according to the embodiment.

Subsequently, descriptions will be made on processing of the connection device 2 with reference to FIG. 6. FIG. 6 is a flowchart illustrating an example of processing of a connection device according to the embodiment As illustrated in FIG. 6, the connection device 2 determines whether an instruction to perform a setting change of changing the setting of the connection information 131 is made from the server 3 (S21). When it is determined that an instruction to perform a setting change of changing the setting of the connection information 131 is made from the server 3 ("YES" at S21), the connection device 2 changes the setting of the connection information 131 (S22).

When it is determined that no instruction to perform a setting change of changing the setting of the connection information 131 is made from the server 3 ("NO" at S21), the connection device 2 determines whether a newly connected terminal 1 is present (S23). When it is determined that a newly connected terminal 1 is present ("YES" at S23), the connection device 2 notifies the server 3 of the newly connected terminal 1 (S24). Accordingly, the connection device 2 notifies the server 3 of an actually connected terminal 1 so as to make it possible for the server 3 to identify the terminal 1 which is not actually connected and exclude the identified terminal 1 from terminals 1 to be connected. To exclude the identified terminal 1 from terminals 1 to be connected, the server 3 may delete the connection terminal information 361 for the identified terminal 1.

When it is determined that no newly connected terminal 1 is present ("NO" at S23), the processing of the connection device 2 is ended.

Figure 7:
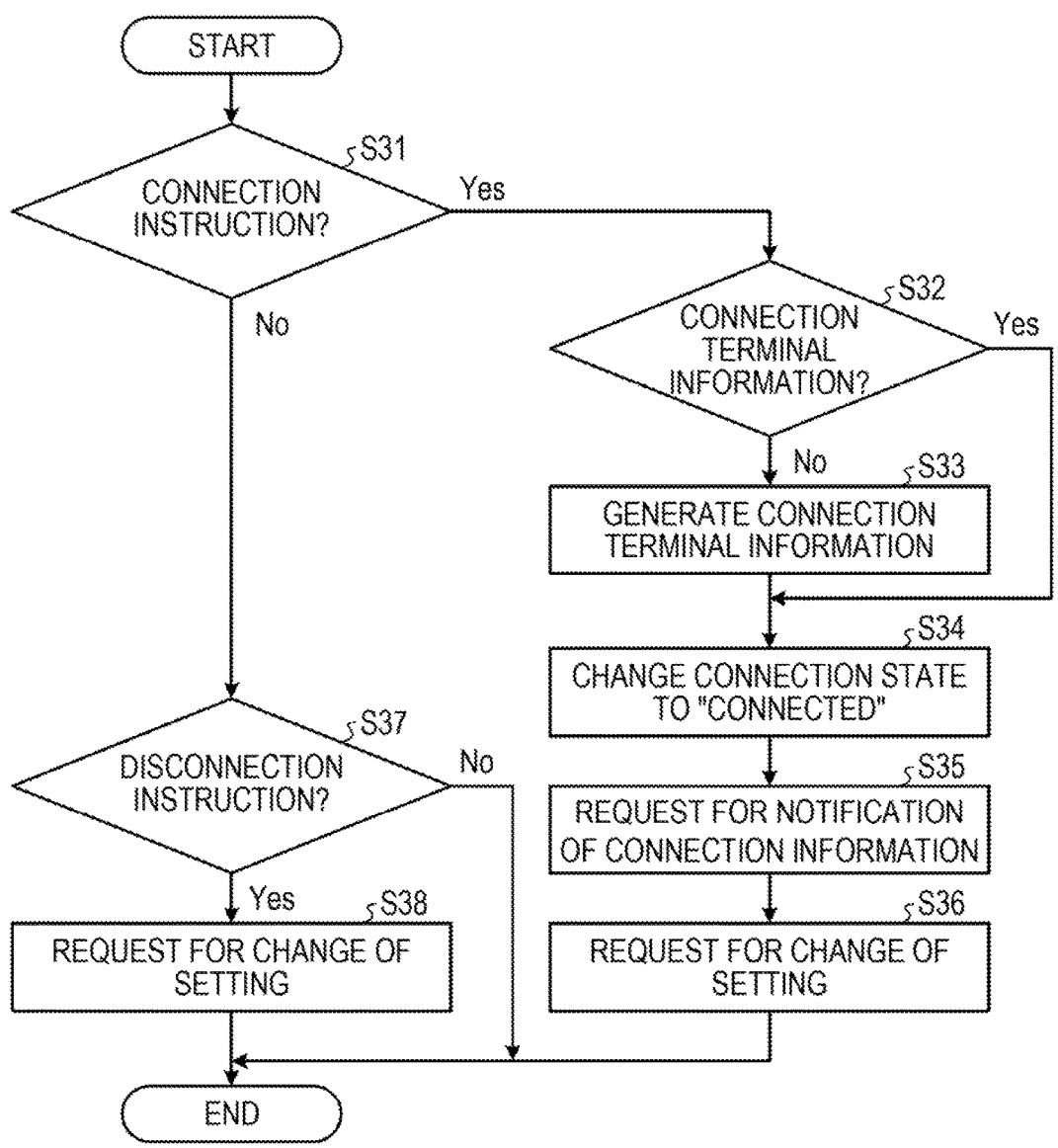
FIG. 7 is a flowchart illustrating an example of processing of a connection terminal management unit according to the embodiment.

Subsequently, descriptions will be made on processing of the server 3 with reference to FIGS. 7 to 10. FIG. 7 is a flowchart illustrating an example of processing of a connection terminal management unit according to the embodiment.

As illustrated in FIG. 7, the connection terminal management unit 32 determines whether a connection instruction for a terminal 1 (or a group) is received from the service application 31 (S31). When it is determined that a connection instruction for a terminal 1 (or a group) is received ("YES" at S31), the connection terminal management unit 32 determines whether connection terminal information 361 for a target terminal 1 is present in the storage unit 36 (S32). When the received connection instruction is with respect to a terminal 1, the terminal 1 is the target terminal 1. When the received connection instruction is with respect to a group, each of terminals 1 included in the group is the target terminal 1.

When it is determined that connection terminal information 361 for the target terminal 1 is present in the storage unit 36 ("YES" at S32), the connection terminal management unit 32 proceeds to S34. When it is determined that no connection terminal information 361 for the target terminal 1 is present in the storage unit 36 ("NO" at S32), the connection terminal management unit 32 generates connection terminal information 361 for the target terminal 1 and stores the connection terminal information 361 in the storage unit 36 (S33). Thereafter, the connection terminal management unit 32 proceeds to S34.

The connection terminal management unit 32 changes the connection state in the connection terminal information 361 for the target terminal 1 to "connected" (S34). At this time, the connection terminal management unit 32 sets the connection information 131 in the connection terminal information 361 for the target terminal 1.

The connection terminal management unit 32 requests the connection information update unit 33 to notify of the connection information 131 (S35). That is, the connection terminal management unit 32 requests the connection information update unit 33 to notify the target terminal 1 of the connection information 131 set in the connection terminal information 361.

The connection terminal management unit 32 requests the connection device controller 34 to perform a setting change (S36). That is, the connection terminal management unit 32 requests the connection device controller 34 to perform a setting change of changing the connection information set in the connection device 2 to the connection information 131 that is set in the connection terminal information 361. Thereafter, the connection terminal management unit 32 ends the processing.

When it is determined that no connection instruction with respect to a terminal 1 (or a group) is received ("NO" at S31), the connection terminal management unit 32 determines whether a disconnection instruction with respect to a terminal 1 (or a group) is received (S37). When it is determined that no disconnection instruction with respect to a terminal 1 (or a group) is received ("NO" at S37), the connection terminal management unit 32 ends the processing.

When it is determined that a disconnection instruction with respect to a terminal 1 (or a group) is received ("YES" at S37), the connection terminal management unit 32 requests the connection device controller 34 to perform a setting change (S38). That is, the connection terminal management unit 32 requests the connection device controller 34 to perform a setting change of changing the connection information set in the connection device 2 to any connection information 131 that is different from the connection information 131 currently set in the connection device 2. The connection terminal management unit 32 ends the processing.

Figure 8:
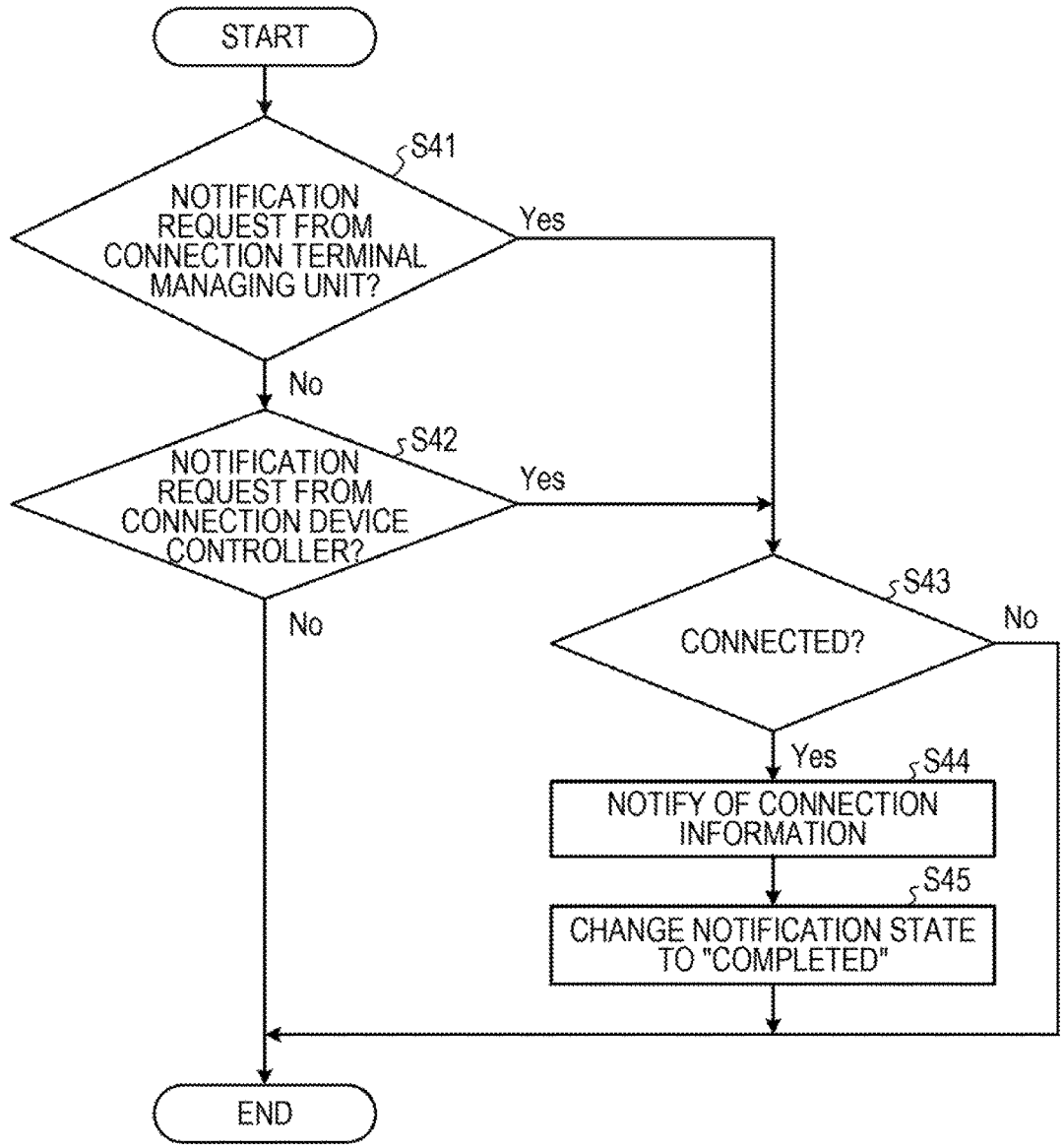
FIG. 8 is a flowchart illustrating an example of processing of a connection information update unit according to the embodiment.

FIG. 8 is a flowchart illustrating an example of processing of a connection information update unit according to the embodiment.

As illustrated in FIG. 8, the connection information update unit 33 determines whether a notification request for connection information 131 is received from the connection terminal management unit 32 (S41). When it is determined that a notification request for connection information 131 is received from the connection terminal management unit 32 ("YES" at S41), the connection information update unit 33 proceeds to S43.

When it is determined that no notification request for connection information 131 is received from the connection terminal management unit 32 ("NO" at S41), the connection information update unit 33 determines whether a notification request for connection information 131 is received from the connection device controller 34 (S42). When it is determined that a notification request for connection information 131 is received from the connection device controller 34 ("YES" at S42), the connection information update unit 33 proceeds to S43.

The connection information update unit 33 determines whether a terminal 1 as a notification destination is connected (S43). When it is determined that the terminal 1 as the notification destination is not connected ("NO" at S43), the connection information update unit 33 ends the processing.

When it is determined that the terminal 1 as the notification destination is connected ("YES" at S43), the connection information update unit 33 notifies the terminal 1 of the connection information 131 (S44). The connection information update unit 33 changes the notification state in the connection terminal information 361 for the terminal 1 to "completed" (S45). The connection information update unit 33 ends the processing.

When it is determined that no notification request for connection information 131 is received from the connection device controller 34 ("NO" at S42), the connection information update unit 33 ends the processing.

Figure 9:
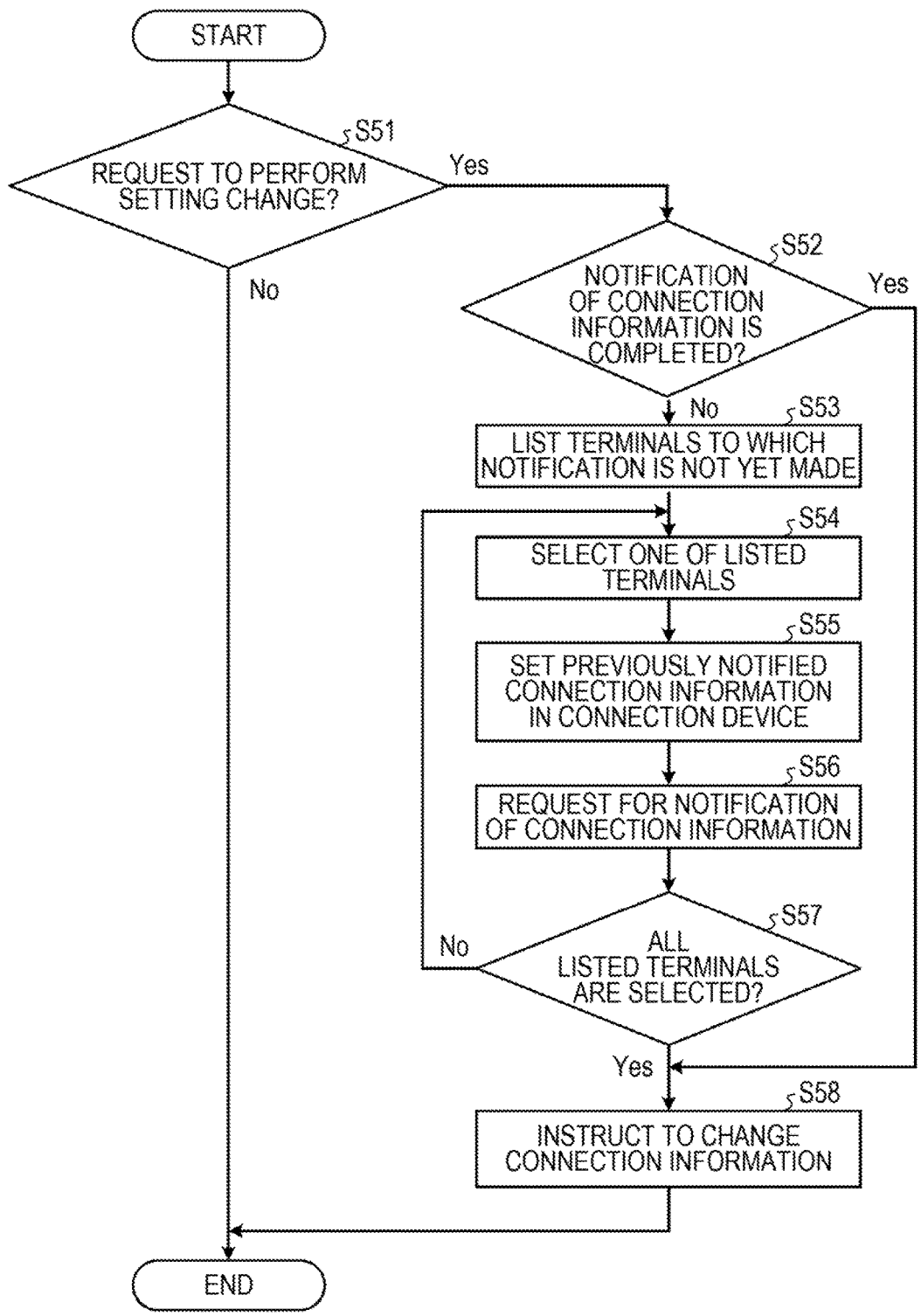
FIG. 9 is a flowchart illustrating an example of processing of a connection device controller according to the embodiment.

FIG. 9 is a flowchart illustrating an example of processing of a connection device controller according to the embodiment.

As illustrated in FIG. 9, the connection device controller 34 determines whether a request to perform a setting change of changing the connection information set in the connection device 2 to the connection information 131 is received from the connection terminal management unit 32 (S51). When it is determined that no request to perform a setting change of changing the connection information set in the connection device 2 to the connection information 131 is received from the connection terminal management unit 32 ("NO" at S51), the connection device controller 34 ends the processing.

When it is determined that a request to perform a setting change of changing the connection information set in the connection device 2 to the connection information 131 is received from the connection terminal management unit 32 ("YES" at S51), the connection device controller 34 determines whether notification of the relevant connection information 131 is completed for all the terminals 1 (S52). When it is determined that notification of the relevant connection information 131 is completed for all the terminals 1 ("YES" at S52), the connection device controller 34 proceeds to S58.

When it is determined that notification of the relevant connection information 131 is not completed for some of the terminals 1 ("NO" at S52), the connection device controller 34 lists, based on the connection terminal information 361, terminals 1 to which the relevant connection information 131 is not yet notified (S53).

The connection device controller 34 selects one of terminals 1 to which the relevant connection information 131 is not yet notified (S54). The connection device controller 34 sets connection information 131, which is already notified to the selected terminal 1, in the connection device 2 so that the selected terminal 1 is able to be connected (S55). Then, the connection device controller 34 requests the connection information update unit 33 to notify the selected terminal 1 of the relevant connection information 131 (S56).

The connection device controller 34 determines whether all the terminals 1 to which the notification is not yet made are selected (S57). When it is determined that some of the terminals 1 are not selected ("NO" at S57), the connection device controller 34 proceeds to S54 to select the next one terminal 1.

When it is determined that all the terminals 1 are selected ("YES" at S57), the connection device controller 34 proceeds to S58. The connection device controller 34 instructs the connection device 2 to perform a setting change of changing the connection information set in the connection device 2 to the relevant connection information 131 (S58). The connection device controller 34 ends the processing.

Figure 10:
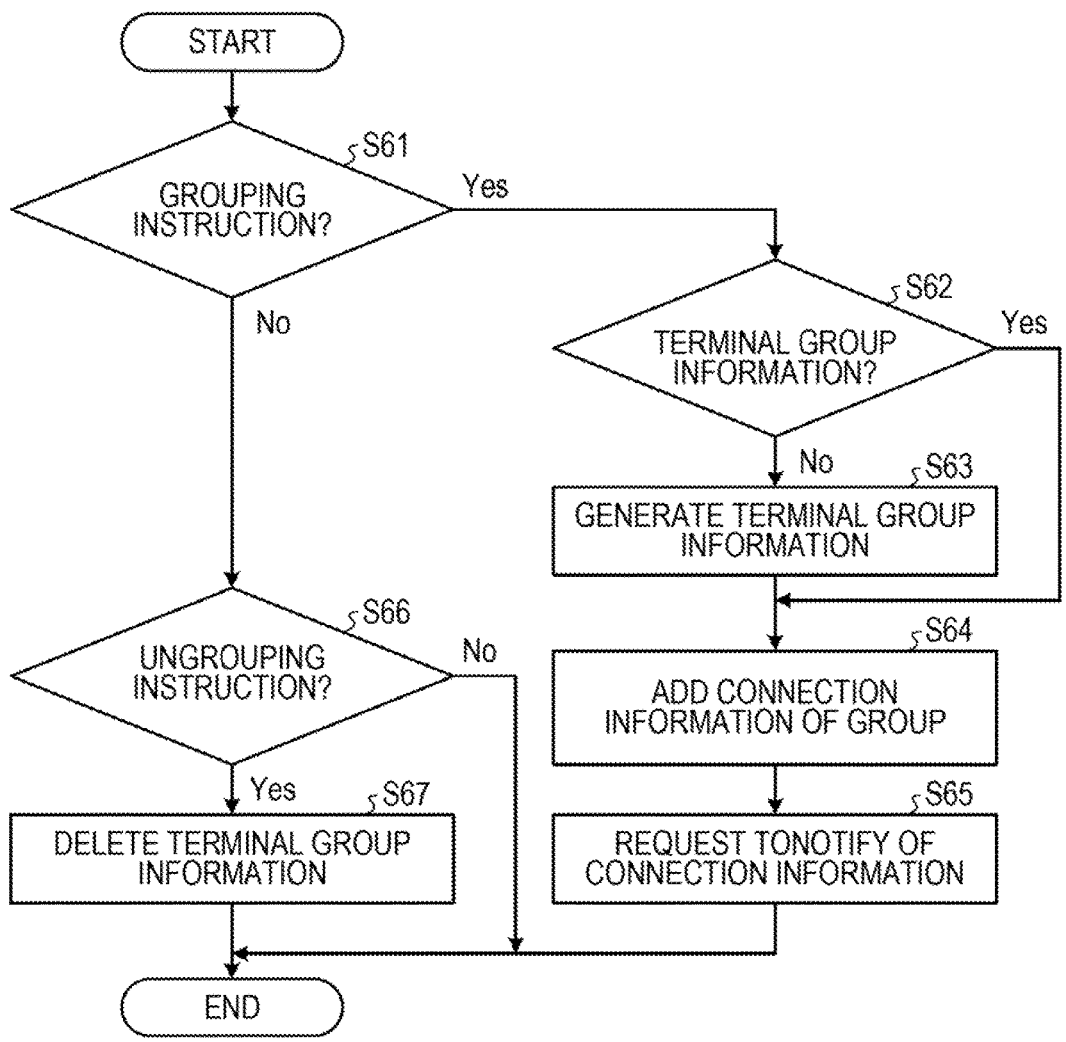
FIG. 10 is a flowchart illustrating an example of processing of a terminal group management unit according to the embodiment.

FIG. 10 is a flowchart illustrating an example of processing of a terminal group management unit according to the embodiment.

As illustrated in FIG. 10, the terminal group management unit 35 determines whether a grouping instruction is received from the service application 31 (S61). When it is determined that no grouping instruction is received from the service application 31 ("NO" at S61), the terminal group management unit 35 proceeds to S66.

When it is determined that a grouping instruction is received from the service application 31 ("YES" at S61), the terminal group management unit 35 determines whether terminal group information 362 corresponding to the grouping instruction is present in the storage unit 36 (S62). When it is determined that terminal group information 362 corresponding to the grouping instruction is present ("YES" at S62), the terminal group management unit 35 proceeds to S64.

When it is determined that no terminal group information 362 corresponding to the grouping instruction is present ("NO" at S62), the terminal group management unit 35 generates terminal group information 362 corresponding to the grouping instruction and stores the terminal group information 362 in the storage unit 36 (S63). The terminal group management unit 35 proceeds to S64.

The terminal group management unit 35 adds connection information 131 for the group to the connection terminal information 361 for each of the grouped terminals 1 and sets the notification state as "not yet" (S64). The terminal group management unit 35 requests the connection information update unit 33 to notify of the connection information 131 (S65). That is, the terminal group management unit 35 requests the connection information update unit 33 to notify the target terminals 1 of the connection information 131 for the group, which is set in the terminal group information 362. The terminal group management unit 35 ends the processing.

The terminal group management unit 35 determines whether an ungrouping instruction is received from the service application 31 (S66). When it is determined that no ungrouping instruction is received from the service application 31 ("NO" at S66), the terminal group management unit 35 ends the processing.

When it is determined that an ungrouping instruction is received from the service application 31 ("YES" at S66), the terminal group management unit 35 deletes terminal group information 362 corresponding to the ungrouping instruction from the storage unit 36 (S67). The terminal group management unit 35 ends the processing.

Figure 11:
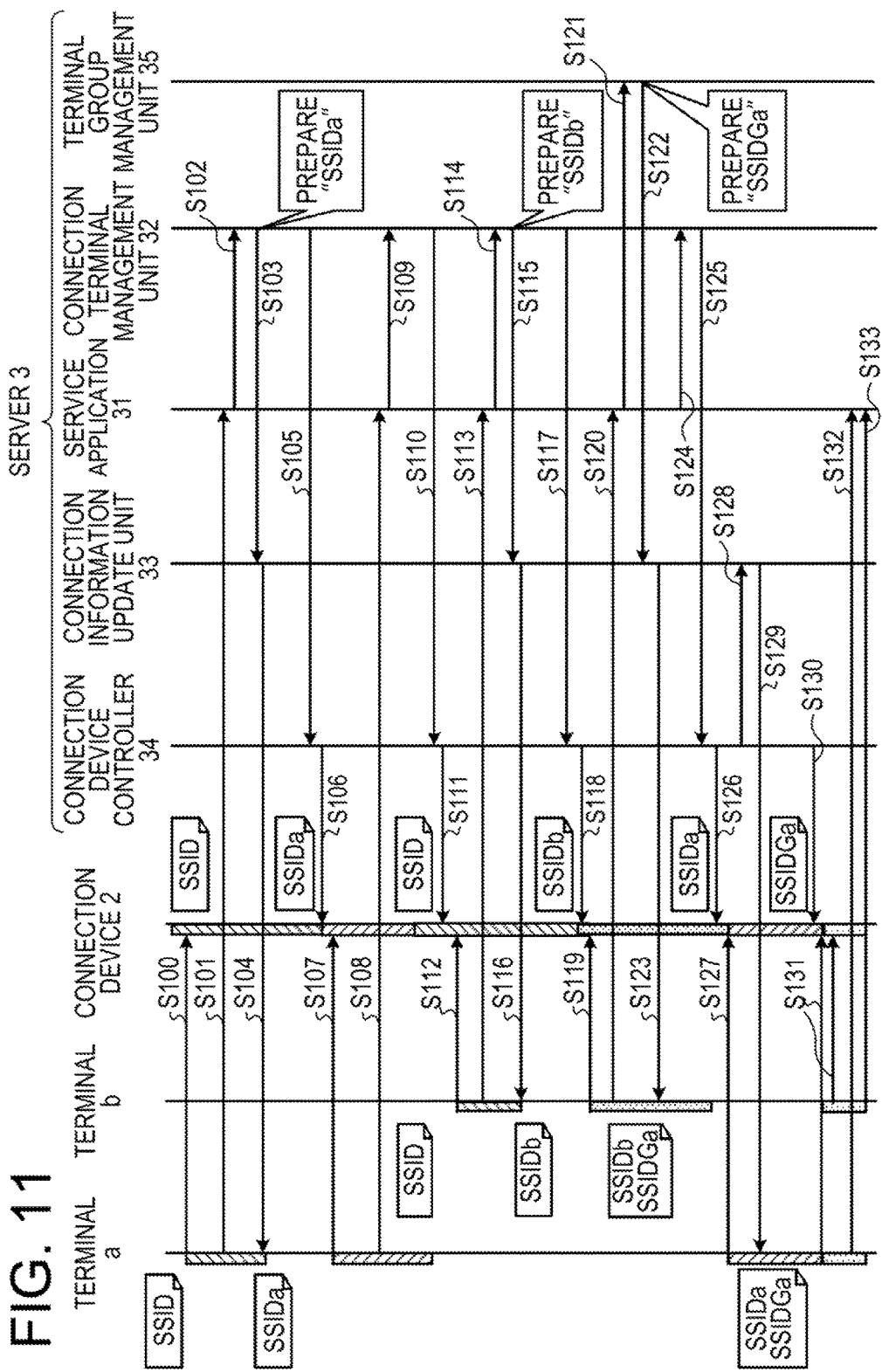
FIG. 11 is a sequence diagram illustrating an example of processing of the information distribution system according to the embodiment.

Subsequently, descriptions will be made on an example of processing of the information distribution system 9 according to the embodiment with reference to FIG. 11. FIG. 11 is a sequence diagram illustrating an example of processing of the information distribution system according to the embodiment. In the following, descriptions will be made with appropriate reference to the connection terminal information 361 illustrated in FIGS. 12A to 12I. Two terminals 1 are described as a terminal "a" and a terminal "b". As an initial value of the connection information 131, "SSID" is set in a storage device or the like included in the terminal "a", the terminal "b", and the connection device 2, respectively.

As illustrated in FIG. 11, the terminal "a" has the connection information 131 "SSID" available to establish a connection to the connection device 2 and thus connects to the connection device 2 wirelessly (S100). The terminal "a" accesses the service application 31 through the connection device 2 (S101). Then, the service application 31 instructs the connection terminal management unit 32 to connect the terminal "a" (S102). Connection terminal information 361 for the terminal "a" is not set in the storage unit 36, and thus the connection terminal management unit 32 generates connection terminal information 361 for the terminal "a" and stores the generated connection terminal information 361 in the storage unit 36. At this time, the connection terminal management unit 32 sets the connection state and connection information 131 in the connection terminal information 361 for the terminal "a". In FIG. 12A, the contents set in the connection terminal information 361 for the terminal "a" are illustrated. That is, "connected" is set as the connection state of the terminal "a", "SSIDa" is set as the connection information 131, "not yet" is set as the notification state, and "absent" is set as a group.

Subsequently, the connection terminal management unit 32 requests the connection information update unit 33 to notify the terminal "a" of the connection information 131 "SSIDa" (S103). Since the connection state of the terminal "a" is "connected", the connection information update unit 33 notifies the terminal "a" of the connection information 131 "SSIDa" (S104). At this time, the connection information update unit 33 sets the notification state in the connection terminal information 361 for the terminal "a" as "completed". In FIG. 12B, contents set in the connection terminal information 361 for the terminal "a" are illustrated. That is, "completed" is set as the notification state. The terminal "a" is connected to the connection device 2, and thus the connection information 131 "SSIDa" is set in the storage unit 13.

Then, the connection terminal management unit 32 requests the connection device controller 34 to perform a setting change of changing the connection information set in the connection device 2 to the connection information 131 "SSIDa" for the terminal "a" (S105). Since the notification state of the terminal "a" is "completed", the connection device controller 34 instructs the connection device 2 to perform a setting change of changing the connection information set in the connection device 2 to the connection information 131 "SSIDa" (S106). The connection device 2 performs a setting change of changing the connection information set in the connection device 2 to the connection information 131 "SSIDa". Then, the communication between the terminal "a" and the connection device 2 is temporarily disconnected.

Since the terminal "a" has the connection information 131 "SSIDa" available to establish a connection to the connection device 2 and thus connects to the connection device 2 wirelessly (S107). The terminal "a" accesses the service application 31 through the connection device 2 (S108). Then, the service application 31 distributes information to the terminal "a". When the distribution of information is finished, the service application 31 transmits a disconnection instruction for the terminal "a" to the connection terminal management unit 32 (S109). Then, the connection terminal management unit 32 sets the connection state in the connection terminal information 361 for the terminal "a" as "disconnected". In FIG. 12C, the contents set in the connection terminal information 361 are illustrated. That is, "disconnected" is set as the connection state of the terminal.

Subsequently, the connection terminal management unit 32 requests the connection device controller 34 to perform a setting change of changing the connection information set in the connection device 2 to connection information 131 different from connection information 131 currently set in the connection device 2 (S110). Then, the connection device controller 34 instructs the connection device 2 to perform a setting change of changing the connection information set in the connection device 2 to the connection information 131 "SSID" which is different from the connection information 131 "SSIDa" which is currently set (S111). The connection device 2 performs a setting change of changing the connection information set in the connection device 2 to the connection information 131 "SSID". Then, the communication between the terminal "a" and the connection device 2 is temporarily disconnected.

Subsequently, the terminal "b" has connection information 131 "SSID" available to establish a connection to the connection device 2 and thus connects to the connection device 2 wirelessly (S112). The terminal "b" accesses the service application 31 through the connection device 2 (S113). Then, the service application 31 instructs the connection terminal management unit 32 to connect the terminal "b" (S114). Connection terminal information 361 for the terminal "b" is not set in the storage unit 36, and thus the connection terminal management unit 32 generates connection terminal information 361 for the terminal "b" and stores the generated connection terminal information 361 in the storage unit 36. At this time, the connection terminal management unit 32 sets the connection state and connection information 131 in the connection terminal information 361 for the terminal "b". In FIG. 12D, the contents set in the connection terminal information 361 for the terminal "b" are illustrated. That is, "connected" is set as the connection state of the terminal "b", "SSIDb" is set as the connection information 131, "not yet" is set as the notification state, and "absent" is set as a group.

Figure 12E:
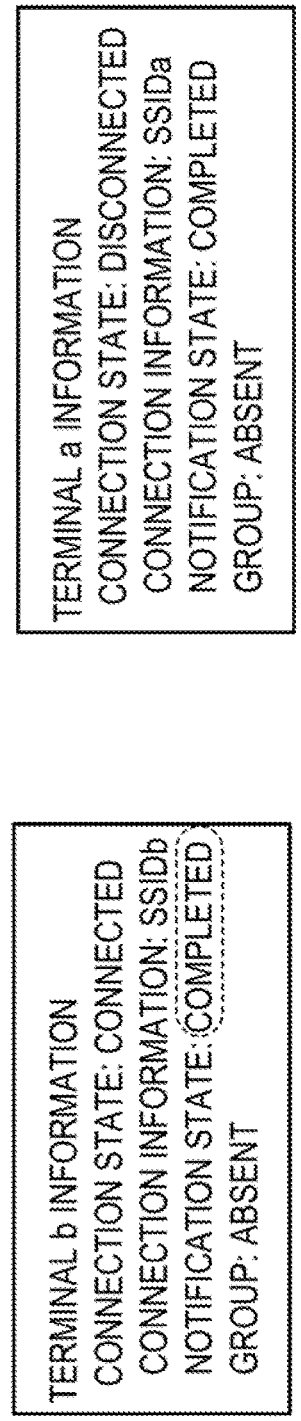
FIG. 12E is a diagram illustrating an example of contents of the connection terminal information.

Subsequently, the connection terminal management unit 32 requests the connection information update unit 33 to notify the terminal "b" of the connection information 131 "SSIDb" (S115). Since the connection state of the terminal "b" is "connected", the connection information update unit 33 notifies the terminal "b" of the connection information 131 "SSIDb" (S116). At this time, the connection information update unit 33 sets the notification state in the connection terminal information 361 for the terminal "b" as "completed". In FIG. 12E, the contents set in the connection terminal information 361 for the terminal "b" are illustrated. That is, "completed" is set as the notification state. The terminal "b" is connected to the connection device 2, and thus the connection information 131 "SSIDb" is set in the storage unit 13.

Then, the connection terminal management unit 32 requests the connection device controller 34 to perform a setting change of changing the connection information set in the connection device 2 to the connection information 131 "SSIDb" for the terminal "b" (S117). Since the notification state of the terminal "b" is "completed", the connection device controller 34 instructs the connection device 2 to perform a setting change of changing the connection information set in the connection device 2 to the connection information 131 "SSIDb" (S118). The connection device 2 performs a setting change of changing the connection information set in the connection device 2 to the connection information 131 "SSIDb". Then, the communication between the terminal "b" and the connection device 2 is temporarily disconnected.

Since the terminal "b" has the connection information 131 "SSIDb" available to establish a connection to the connection device 2 and thus connects to the connection device 2 wirelessly (S119). The terminal "b" accesses the service application 31 through the connection device 2 (S120). Then, the service application 31 transmits a grouping instruction for the terminal "a" and the terminal "b" to the terminal group management unit 35 (S121).

Figure 12F:
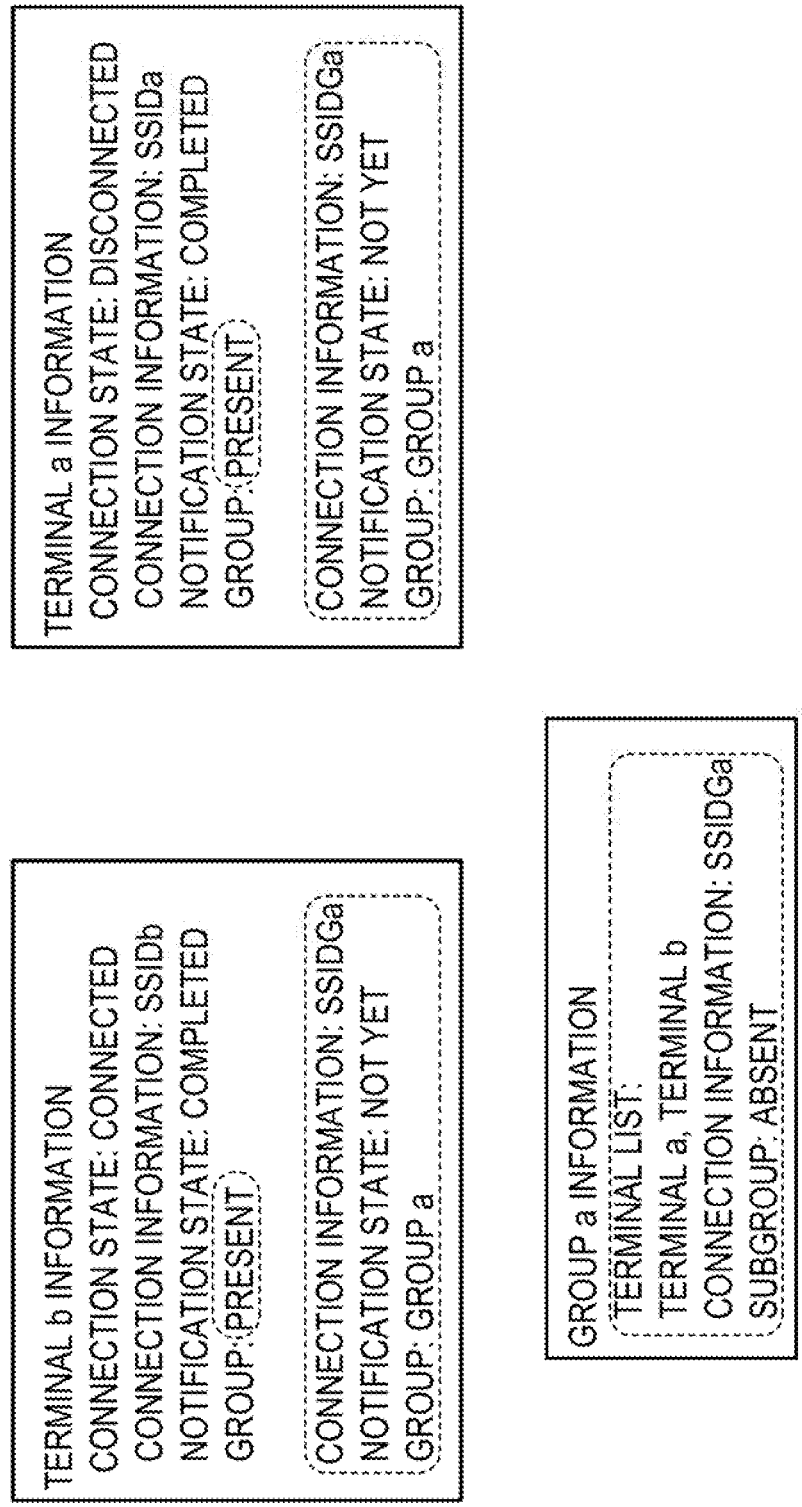
FIG. 12F is a diagram illustrating an example of contents of the connection terminal information.

Since the terminal group information 362 corresponding to the grouping instruction is absent, the terminal group management unit 35 generates terminal group information 362 corresponding to the grouping instruction and stores the generated terminal group information 362 in the storage unit 36. At this time, the terminal group management unit 35 sets a terminal list and connection information 131 for a group "a" in the terminal group information 362. Also, the terminal group management unit 35 sets information indicating that grouping is made in respective pieces of the connection information 131 for the terminal "a" and the terminal "b". In FIG. 12F, the contents set in the terminal group information 362 for the group "a" are illustrated. That is, "terminal a" and "terminal b" are set as the terminal list, "SSIDGa" is set as the connection information 131, and "absent" is set as the subgroup. Also, the contents set in the connection terminal information 361 for the terminal "a" are illustrated. That is, "present" is set as the group, "SSIDGa" is set as the connection information 131, "not yet" is set as the notification state, and "group a" is set as the group. Also, information indicating that grouping is made is set in the connection terminal information 361 for the terminal "b", similarly to the connection terminal information 361 for the terminal "a".

Figure 12G:
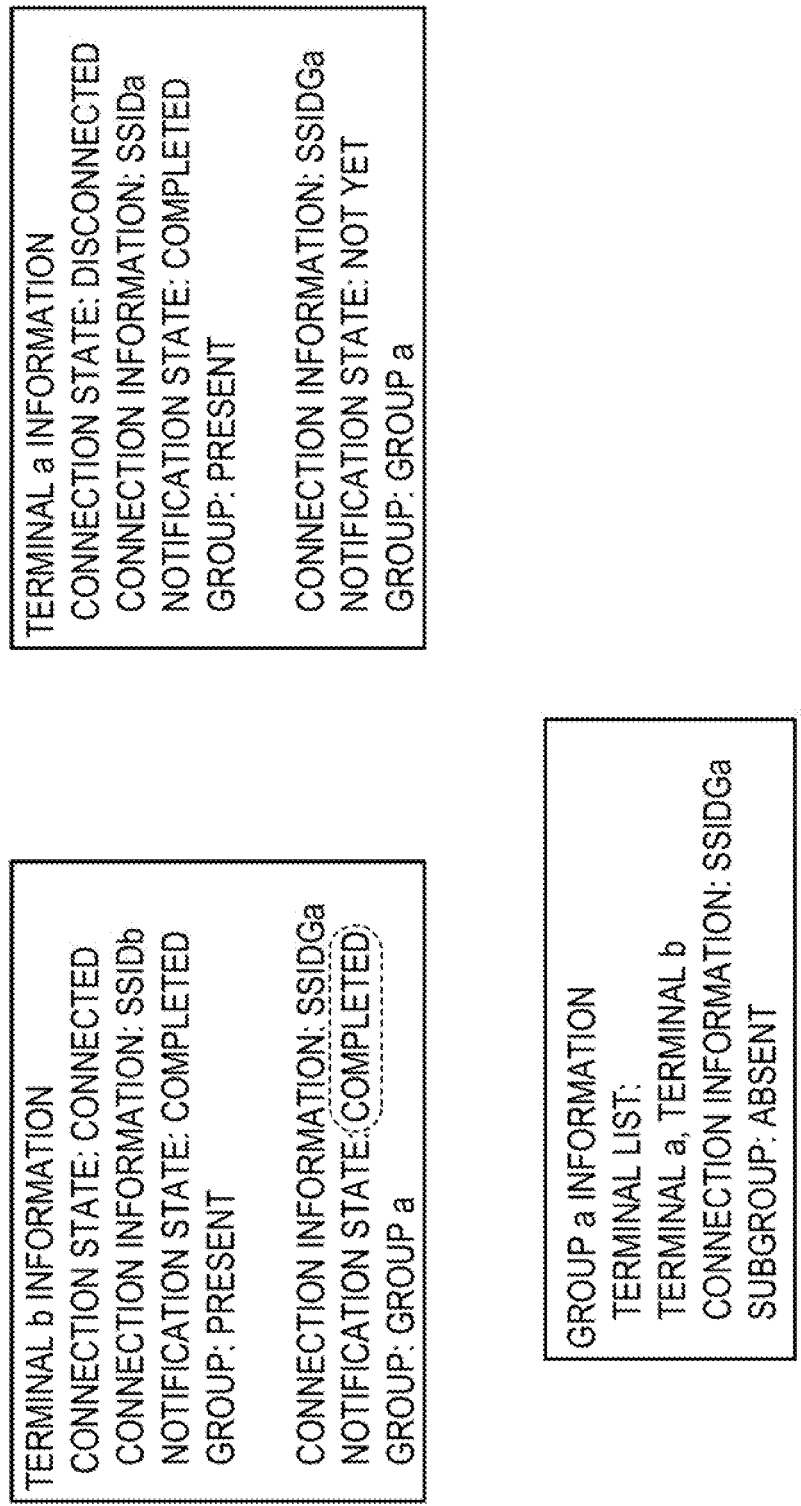
FIG. 12G is a diagram illustrating an example of contents of the connection terminal information.

Subsequently, the terminal group management unit 35 requests the connection information update unit 33 to notify the group "a" of the connection information 131 "SSIDGa" (S122). Since the connection state of terminal "b" is "connected", the connection information update unit 33 notifies the terminal "b" of the connection information 131 "SSIDGa" (S123). At this time, the connection information update unit 33 sets the notification state of the group in the connection terminal information 361 for the terminal "b" as "completed". In FIG. 12G, the contents set in the connection terminal information 361 for the terminal "b" are illustrated. That is, "completed" is set as the notification state. The terminal "b" is connected to the connection device 2, and thus the connection information 131 "SSIDGa" is set in the storage unit 13.

Figure 12H:
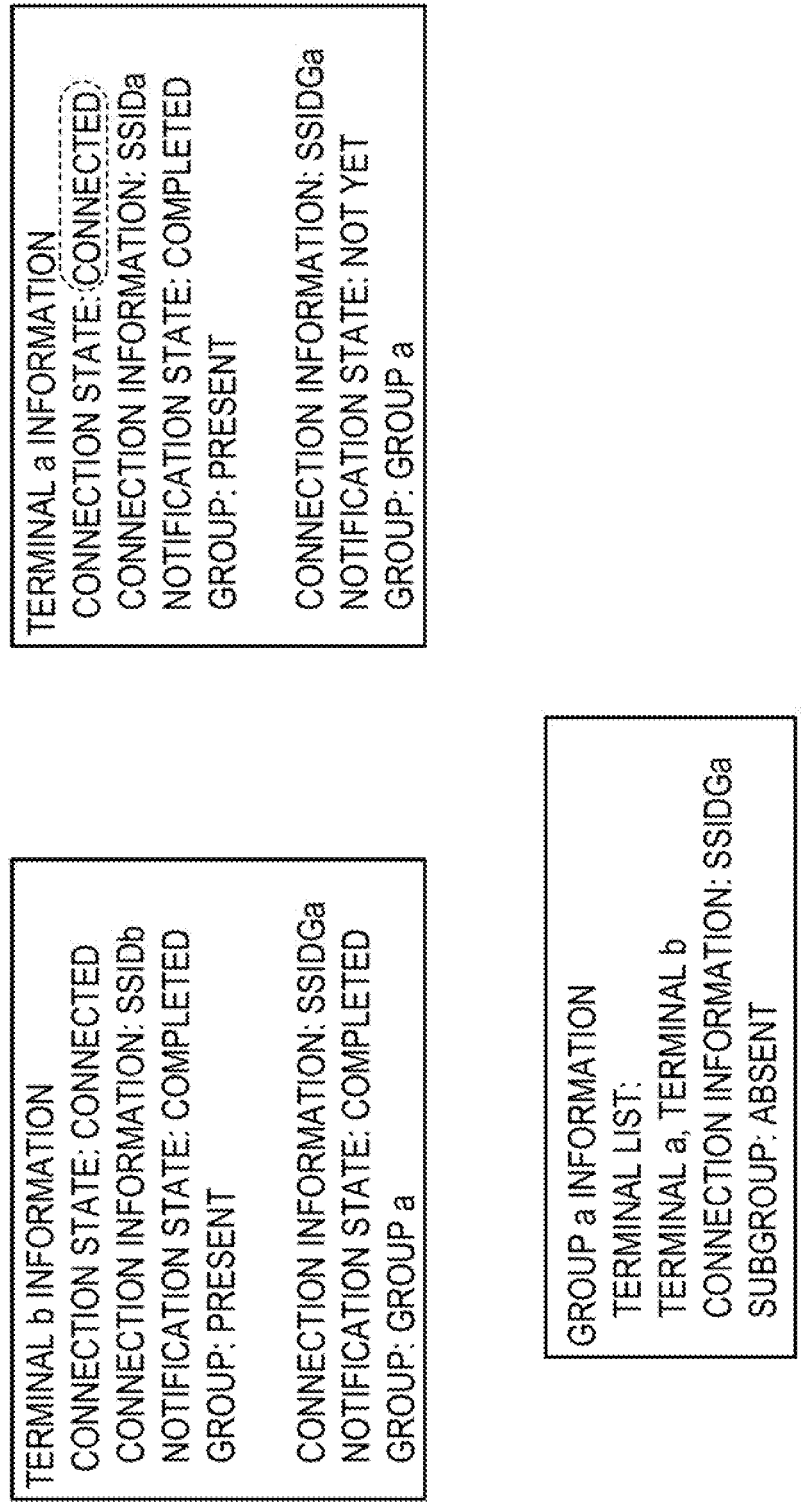
FIG. 12H is a diagram illustrating an example of contents of the connection terminal information.

Subsequently, the service application 31 instructs the connection terminal management unit 32 to connect to the group "a" (S124). Since the connection terminal information 361 for the terminal "a" belonging to the group "a" is present in the storage unit 36, the connection terminal management unit 32 sets the connection state in the connection terminal information 361 for the terminal "a" as "connected". In FIG. 12H, the contents set in the connection terminal information 361 for the terminal "a" are illustrated. That is, "connected" is set as the connection state of the terminal "a".

Since the terminal "a" to which the connection information 131 for the group "a" is not yet notified is not connected to the connection device 2, the connection terminal management unit 32 is unable to request to the connection information update unit 33 to notify of the connection information 131 for the group "a". Thus, the connection terminal management unit 32 requests the connection device controller 34 to perform a setting change of changing the connection information set in the connection device 2 to the connection information 131 "SSIDGa" for the group "a" (S125). Then, the connection device controller 34 lists the terminals 1 to which the connection information 131 "SSIDGa" for the group "a" is not yet notified. Here, the terminal "a" is listed.

The connection device controller 34 instructs the connection device 2 to perform a setting change of changing the connection information set in the connection device 2 to the connection information 131 "SSIDa" so that the listed terminal "a" is able to be connected to the connection device 2 (S126). The connection device 2 performs the setting change of changing the connection information set in the connection device 2 to the connection information 131 "SSIDa". Then, the communication between the terminal "b" and the connection device 2 is temporarily disconnected. The terminal "a" has the connection information 131 "SSIDa" available to establish a connection to the connection device 2 and thus is able to connect to the connection device 2 wirelessly (S127).

Figure 12I:
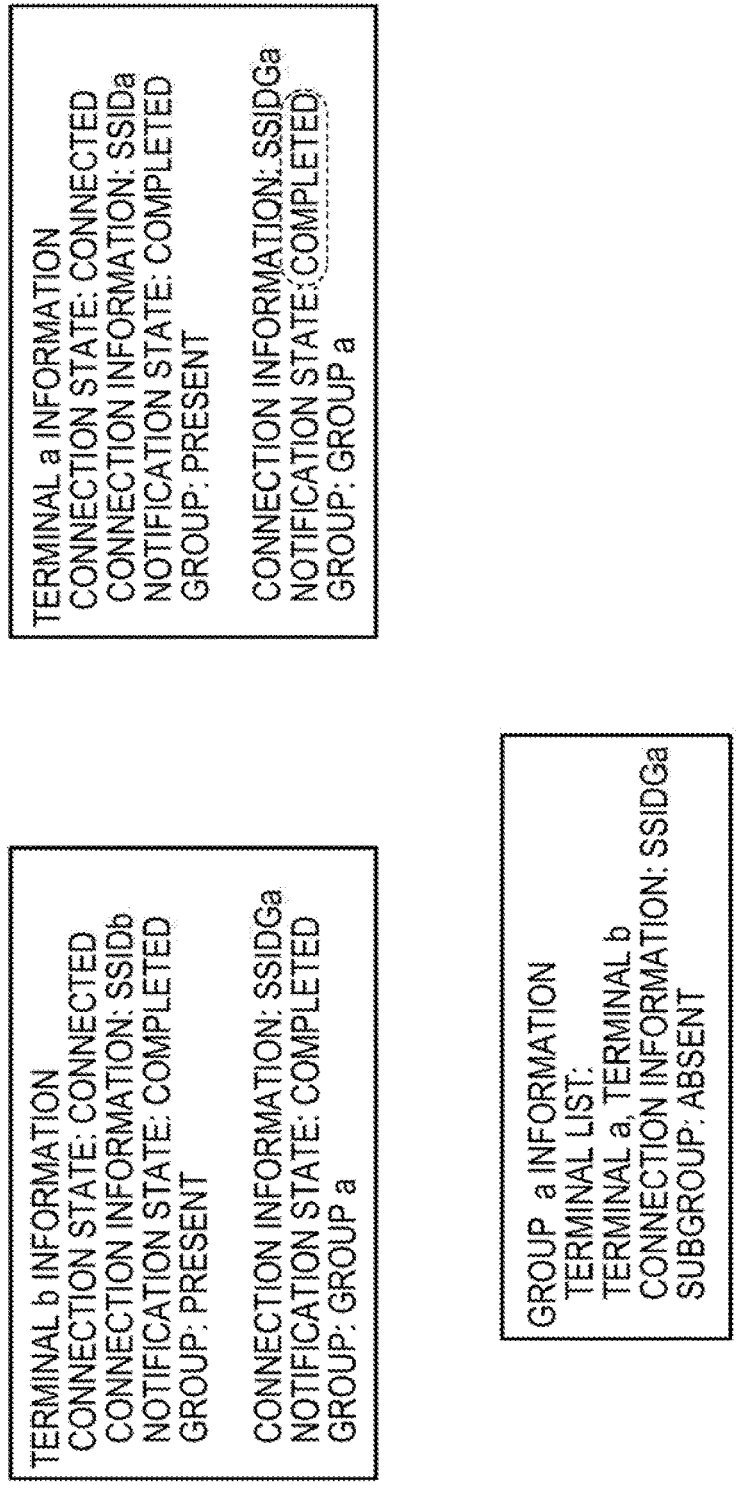
FIG. 12I is a diagram illustrating an example of contents of the connection terminal information.

Subsequently, the connection device controller 34 requests the connection information update unit 33 to notify the terminal "a" of the connection information 131 "SSIDGa" for the group "a" (S128). Since the terminal "a" is connected to the connection device 2, the connection information update unit 33 notifies the terminal "a" of the connection information 131 "SSIDGa" for the group "a" (S129). At this time, the connection information update unit 33 sets the notification state of the group in the connection terminal information 361 for the terminal "a" as "completed". In FIG. 12I, the contents set in the connection terminal information 361 for the terminal "a" are illustrated. That is, "completed" is set as the notification state of the group "a". The terminal "a" stores the connection information 131 "SSIDGa" in the storage unit 13.

Since the notification state of the group "a" in the connection terminal information 361 for the terminal "a" is "completed", and thus the connection device controller 34 instructs the connection device 2 to perform a setting change of changing the connection information set in the connection device 2 to the connection information 131 "SSIDGa" (S130). The connection device 2 performs the setting change of changing the connection information set in the connection device 2 to the connection information 131 "SSIDGa". Then, the communication between the terminal "a" and the connection device 2 is temporarily disconnected.

Subsequently, the terminal "a" and the terminal "b" have the connection information 131 "SSIDGα" available to establish a connection to the connection device 2 and thus connect to the connection device 2 wirelessly (S131). The terminal "a" accesses the service application 31 through the connection device 2 (S132). The terminal "b" accesses the service application 31 through the connection device 2 (S133).

Figure 13:
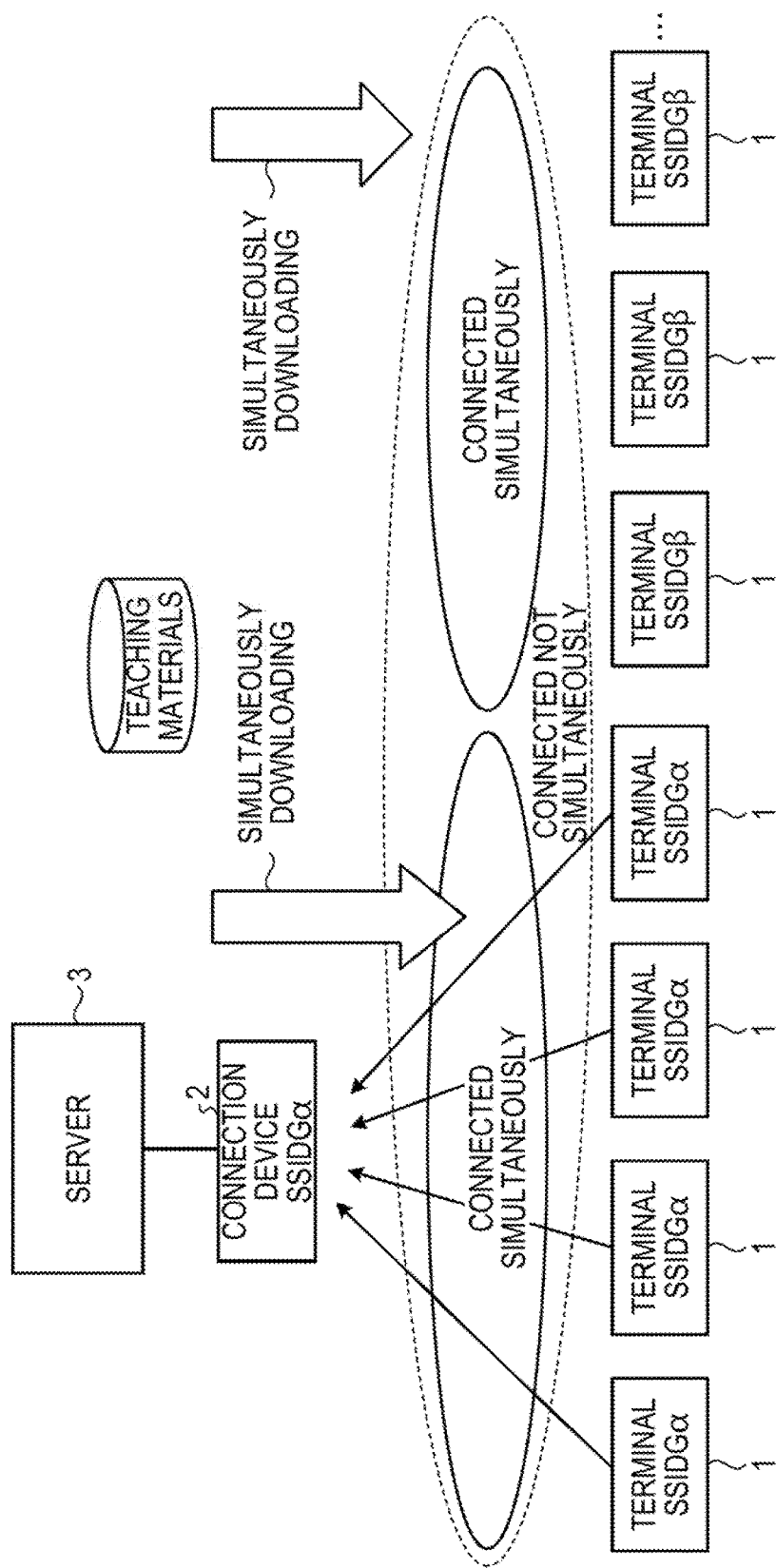
FIG. 13 is a diagram illustrating an example of the use of the information distribution system according to the embodiment.

FIG. 13 is a diagram illustrating an example of the use of the information distribution system according to the embodiment. When all the terminals 1 are not simultaneously connected to the connection device 2, the server 3 groups the terminals 1 and allows each of the group terminals 1 to be connected. That is, the server 3 notifies the group terminals 1 of the connection information 131 for the group used for allowing the terminals to be individually connected to the connection device 2. The group terminals 1 store the connection information 131 for the group notified from the server 3. Then, the server 3 instructs the connection device 2 to perform a setting change of changing the connection information set in the connection device 2 to the connection information 131 for the group. The connection device 2 performs the setting change of changing the connection information set in the connection device 2 to the connection information 131 for the group so as to limit the terminals 1 to be connected. Here, the connection information 131 for the group is "SSIDGα".

As a result, the terminals 1 having the connection information 131 "SSIDGα" are able to be simultaneously connected to the connection device 2 and thus, to simultaneously download information from the server 3. Here, the information to be downloaded is, for example, data of teaching materials.

When the download from the server 3 is finished, the server 3 notifies other group terminals 1 of the connection information 131 for the other group used for allowing the terminals to be individually connected to the connection device 2. The group terminals 1 store the connection information 131 for the other group notified from the server 3. Then, the server 3 instructs the connection device 2 to perform a setting change of changing the connection information set in the connection device 2 to the connection information 131 for the other group. The connection device 2 performs the setting change of changing the connection information set in the connection device 2 to the connection information 131 for the other group so as to limit the terminals 1 to be connected. Here, the connection information 131 for other group is "SSIDGβ".

As a result, the terminals 1 having the connection information 131 "SSIDGβ" are able to be simultaneously connected to the connection device 2 and thus, to simultaneously download information from the server 3.

According to the embodiment described above, the server 3 notifies a terminal 1 which has made an access request, among a plurality of terminals 1, of the connection information 131 used for the individual connection to the connection device 2. The server 3 sets, in the connection device 2, the connection information 131 for the terminal 1 to be connected, in accordance with the predetermined method of scheduling. With this configuration, even in a situation where the connection device 2 is unable to be connected to all multiple terminals 1 that desire the connection, the server 3 may effectively connect the connection device 2 to the multiple terminals 1 that desire the connection. That is, the server 3 may connect the multiple terminals 1 that desire the connection to the connection device 2, by setting, in the connection device 2, connection information 131 identical to the connection information 131 for a terminal 1 to be connected, in accordance with the predetermined method of scheduling.

According to the embodiment described above, when multiple terminals 1 are grouped, the server 3 notifies the same connection information 131 to each terminal 1 of the grouped terminals 1. The server 3 selectively sets the connection information 131 for the grouped terminals 1 in the connection device 2 in accordance with the predetermined method of scheduling. With this configuration, the server 3 may effectively connect the multiple terminals 1 that desire the connection to the connection device 2, by setting, in the connection device 2, connection information 131 identical to the connection information 131 for the multiple grouped terminals 1. The server 3 may control the number of terminals 1 that may be connected simultaneously, by grouping the terminals 1.

According to the embodiment described above, the connection information update unit 33 of the server 3 notifies a terminal 1 which has made an access request, among a plurality of terminals 1, of the connection information 131 used for the individual connection to the connection device 2. The connection device controller 34 of the server 3 sets, in the connection device 2, the connection information 131 for the terminal 1 to be connected, in accordance with the predetermined method of scheduling. Then, the terminal 1 is connected to the connection device 2 using the connection information 131 notified from the server 3. That is, the server 3 causes the terminal 1 to be connected to the connection device 2, by performing a setting change of changing the connection information set in the connection device 2 to the connection information 131 for the terminal 1 to be connected. However, the server 3 may cause the terminal 1 to be connected to the connection device 2 without performing the setting change of changing the connection information set in the connection device 2 to the connection information 131 for the terminal 1 to be connected. For example, the information distribution system 9 may be equipped with a plurality of beacons. Here, a case where four beacons are equipped will be described. In this case, each terminal 1 stores in the storage unit 13, in advance, beacon information for a case where a connection may be allowed to each terminal 1. As an example, it is assumed that a terminal "a" may be connected to the connection device 2 when a beacon "a" is "0", a beacon "b" is "0", a beacon "c" is "0", and a beacon "d" is "1". It is assumed that a terminal "b" may be connected to the connection device 2 when the beacon "a" is "0", the beacon "b" is "0", the beacon "c" is "1", and a beacon "d" is "0". The terminal 1 detects beacon information, and the terminal 1 may be connected to the connection device 2 when the detected beacon information coincides with the beacon information stored in advance. The server 3 may control the beacon information. Accordingly, the server 3 may effectively connect the plurality of terminals 1 that desire the connection to the connection device 2, by setting beacon information to match the beacon information for the terminal 1 to be connected in accordance with the predetermined method of scheduling.

Each component of the illustrated apparatus is not necessarily required to be configured physically as illustrated therein. That is, concrete forms of distribution or integration of the individual units are not limited to those illustrated, and all or some of the units may be configured to be functionally or physically distributed or integrated in arbitrary units depending on, for example, various loads or use conditions. For example, the terminal group management unit 35 may be separated into a processing unit for a case of receiving a grouping instruction and a processing unit for a case of receiving an ungrouping instruction. The connection terminal management unit 32 may be separated into a processing unit for a case of receiving a connection instruction of a specific terminal 1 and a processing unit for a case of receiving a connection instruction of a specific terminal group. The storage unit 36 may be configured to be connected as an external device of the server 3 through a network.

Figure 14:
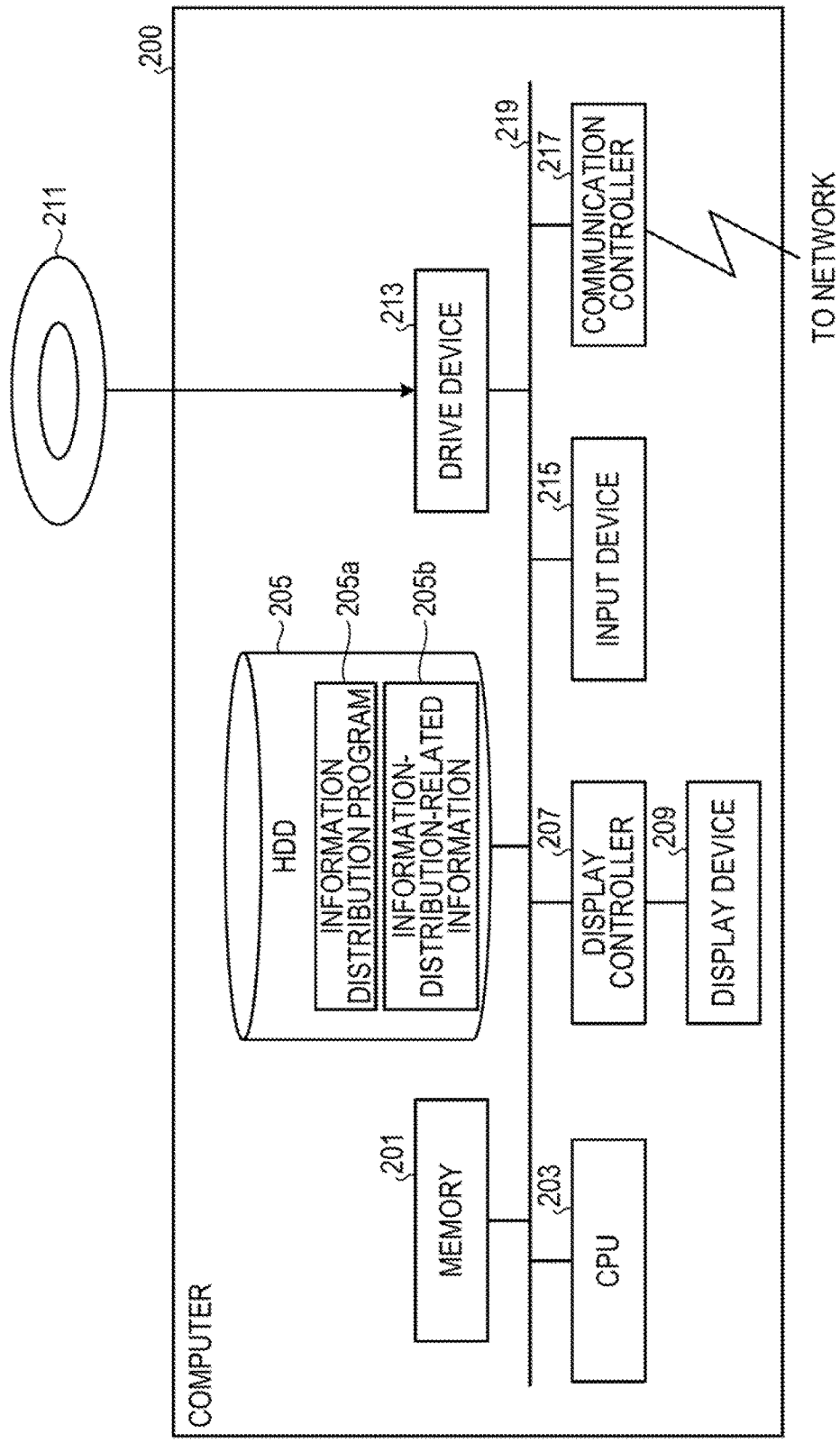
FIG. 14 is a diagram illustrating an example of a computer that executes an information distribution program.

The various processes described above in the embodiment may be implemented by causing a computer such as a personal computer or a workstation to execute a program prepared in advance. In the following, an example of a computer that executes an information distribution program implementing functions identical to that of the server 3 illustrated in FIG. 1 will be described. FIG. 14 is a diagram illustrating an example of a computer that executes an information distribution program. The functions of the terminal 1 and the connection device 2 may also be implemented by causing a similar computer to execute a program.

As illustrated in FIG. 14, a computer 200 includes a central processing unit (CPU) 203 that performs various arithmetic processing, an input device 215 receiving an input of data from a user, and a display controller 207 controlling a display device 209. Further, the computer 200 includes a drive device 213 for reading, for example, a program from a storage medium, and a communication controller 217 for performing a data communication with another computer through a network. Further, the computer 200 includes a memory 201 temporarily storing various types of information and a hard disc drive (HDD) 205. The memory 201, the CPU 203, the HDD 205, the display controller 207, the drive device 213, the input device 215, and the communication controller 217 are connected to each other through a bus 219.

The drive device 213 is, for example, a device for reading data from a removable disk 211.

The CPU 203 reads an information distribution program 205a, loads the program in the memory 201, and executes the program as a process. The process corresponds to each functional unit of the terminal 1 and the server 3. Information-distribution-related information 205b corresponds to the connection terminal information 361 and the terminal group information 362 in the server 3. For example, the removable disk 211 stores information such as the information distribution program 205a.

The information distribution program 205a may not necessarily be stored in the HDD 205 from the beginning. For example, the program may be stored in a "portable physical medium", such as a flexible disk (FD), a compact disc read-only memory (CD-ROM), a digital versatile disc (DVD), a magneto optical disk, or an integrated circuit (IC) card, which is inserted into the computer 200. The computer 200 may read the information distribution program 205a from the portable physical medium to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information distribution system, comprising:
   a first device that serves as an access point, the first device including:
      a first memory, and
      a first processor coupled to the first memory,
      wherein the first processor is configured to:
         receive a change instruction accompanied by connection information used to allow one of a plurality of terminals or a group of terminals among the plurality of terminals to be coupled to the first device, the change instruction instructing to change first connection information currently stored in the first memory to the accompanying connection information, and
         perform the change; and
   a server including:
      a second memory, and
      a second processor coupled to the second memory,
      wherein the second processor is configured to:
         receive an access request from a first terminal among the plurality of terminals, the access request requesting to access the server,
         notify the first terminal of second connection information used to allow the first terminal to be individually coupled to the first device,
         set, in the first device, connection information identical to connection information for the first terminal to be coupled to the first device in accordance with a predetermined method of scheduling, and
         transmit to the first device, upon determining to allow the first terminal to access the server, a first change instruction accompanied by the second connection information to allow the first terminal to access the server.

2. The information distribution system according to claim 1, wherein
   the second processor is configured to:
   notify second terminals among the plurality of terminals of third connection information, the second terminals being included in a first group, the third connection information being used to allow any terminal included in the first group to be coupled to the first device, and
   transmit to the first device, upon determining to allow the second terminals to access the server, a second change instruction accompanied by the third connection information to allow the second terminals to access the server.

3. An information distribution apparatus, comprising:
   a memory configured to store therein connection information used to allow one of a plurality of terminals or a group of terminals among the plurality of terminals to be coupled to the information distribution apparatus;
   a processor coupled to the memory and
   a connector that serves as an access point,
   wherein the processor is configured to:
      receive an access request from a first terminal among the plurality of terminals, the access request requesting to access the information distribution apparatus,
      notify the first terminal of first connection information used to allow the first terminal to be individually coupled to the information distribution apparatus,
      set, in the connector, connection information identical to connection information for the first terminal to be coupled to the information distribution apparatus in accordance with a predetermined method of scheduling, and change, upon determining to allow the first terminal to access the information distribution apparatus, second connection information currently stored in the memory to the first connection information to allow the first terminal to access the information distribution apparatus.

4. The information distribution apparatus according to claim 3, wherein the processor is configured to:

notify second terminals among the plurality of terminals of third connection information, the second terminals being included in a first group, the third connection information being used to allow any terminal included in the first group to be coupled to the information distribution apparatus, and change, upon determining to allow the second terminals to access the information distribution apparatus, fourth connection information currently stored in the memory to the third connection information to allow the second terminals to access the information distribution apparatus.

5. A non-transitory computer-readable recording medium having stored therein a program that causes a computer to execute a process, the process comprising:

receiving an access request from a first terminal among a plurality of terminals, the access request requesting to access the computer;

notifying the first terminal of first connection information used to allow the first terminal to be individually coupled to the computer;

setting, in the computer, connection information identical to connection information for the first terminal to be coupled to the computer in accordance with a predetermined method of scheduling; and changing, upon determining to allow the first terminal to access the computer, second connection information currently stored in a memory with the first connection information to allow the first terminal to access the computer.

6. The non-transitory computer-readable recording medium according to claim 5, the process further comprising:

notifying second terminals among the plurality of terminals of third connection information, the second terminals being included in a first group, the third connection information being used to allow any terminal included in the first group to be coupled to the computer; and changing, upon determining to allow the second terminals to access the computer, fourth connection information currently stored in the memory with the third connection information to allow the second terminals to access the computer.

* * * * *